US006633852B1

(12) United States Patent
Heckerman et al.

(10) Patent No.: US 6,633,852 B1
(45) Date of Patent: Oct. 14, 2003

(54) PREFERENCE-BASED CATALOG BROWSER THAT UTILIZES A BELIEF NETWORK

(75) Inventors: David E. Heckerman, Bellevue, WA (US); Christopher A. Meek, Kirkland, WA (US); Usama M. Fayad, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/316,704

(22) Filed: May 21, 1999

(51) Int. Cl.⁷ .............................................. G06F 17/60
(52) U.S. Cl. .......................................... 705/27; 706/12
(58) Field of Search ............................. 705/27, 14, 26; 706/12, 52

(56) References Cited

U.S. PATENT DOCUMENTS

| | | | |
|---|---|---|---|
| 5,704,017 A | * 12/1997 | Heckerman et al. | 706/12 |
| 6,012,051 A | * 1/2000 | Sammon, Jr. et al. | 705/26 X |
| 6,014,638 A | * 1/2000 | Burge et al. | |
| 6,327,574 B1 | * 12/2001 | Kramer et al. | 705/14 |

FOREIGN PATENT DOCUMENTS

WO     WO 98/03907    * 1/1998

OTHER PUBLICATIONS

Breese et al., " Empirical Analysis of Predictive Algorithms for Collaboratvie Filtering" Proc. Uncertainty in Artificial Intelligence, p. 43–52, Jul. 24–26, 1998.*

Madigan et al., "Graphical Explanation in Belief Networks", Journal of Computational and Graphical Statitstics, v. 6, n. 3, p. 160–181, 1997.*

* cited by examiner

*Primary Examiner*—M. Kemper
(74) *Attorney, Agent, or Firm*—Amin & Turocy, LLP

(57) ABSTRACT

An electronic shopping aid is provided that assists a user in selecting a product from an electronic catalog of products based on their preferences for various features of the products. Since the electronic shopping aid helps a user select a product based on the user's preferences, it is referred to as a preference-based product browser. In using the browser, the user initially inputs an indication of their like or dislike for various features of the products as well as an indication of how strongly they feel about the like or dislike. The browser then utilizes this information to determine a list of products in which the user is most likely interested. As part of this determination, the browser performs collaborative filtering and bases the determination on what other users with similar characteristics (e.g., age and income) have liked. After creating this list, the browser displays the list and also displays a list of features which the user has not indicated either a like or a dislike for and which the browser has identified as being most relevant to the determination of the products that the user may like. Thus, by specifying a like or dislike for one or more of these features, the user helps the browser to more accurately determine the products in which the user will most likely be interested by having the user state a preference for only those features that the browser deems most important to the determination process.

48 Claims, 16 Drawing Sheets

| Age | Income | Weight | Max RAM | Desired Power | Battery Memory | Lifetime | Laptop 1 | Laptop 2 | Laptop 3 | Laptop 4 |
|---|---|---|---|---|---|---|---|---|---|---|
| Child | Low | Heavy | <32M | Cheap | | | Yes | Yes | No | No |
| Adult | High | Light | <32M | | No | >12 hrs | No | No | Yes | Yes |
| Child | Low | Light | >32M | Cheap | | <12 hrs | Yes | No | No | No |
| ... | | | | | | | | | | |

*Fig. 5*

PREFERENCE-BASED CATALOG BROWSER THAT UTILIZES A BELIEF NETWORK

TECHNICAL FIELD

The present invention relates generally to data processing systems and, more particularly, to a preference-based product browser that utilizes a belief network.

BACKGROUND OF THE INVENTION

Systems currently exist that display an electronic catalog of products to a user so that the user may select one or more products that suit their needs. These systems typically display hundreds or even thousands of products to the user, and each product may have tens or hundreds of features. When a user is attempting to select a product, however, the user is left to aimlessly peruse the catalog with little or no direction. The user is thus confronted with numerous products with numerous features and must evaluate each product before they can select the product that best suits their needs. Many users become frustrated with the overwhelming task of selecting a product from among numerous choices, and consequently, these users do not purchase a product. It is thus desirable to improve such product selection systems.

An exemplary embodiment of the present invention is described below as using a belief network, so to better explain the details of the exemplary embodiment, an overview of belief networks is presented. A belief network is a representation of the probabilistic relationships among distinctions about the world. A distinction in a belief network can take on a set of values and are thus called variables. A belief network is expressed as an acyclic-directed graph where the variables correspond to nodes, and the relationships between the nodes correspond to arcs. FIG. 1 depicts an example belief network 101. The belief network 101 contains three variables, $x_1$, $x_2$, and $x_3$, which are represented by nodes 102, 106, and 110, respectively. Also, the example belief network 101 contains two arcs 104 and 108. Associated with each variable in a belief network is a set of probability distributions. Using conditional probability notation, the set of probability distributions for a variable can be denoted by $p(x_i|pa(x_i))$, where "p" refers to the probability distribution and where "$pa(x_i)$" denotes the parents of variable $x_i$. Thus, this expression reads as follows, "the probability distribution for variable $x_i$ given the parents of $x_i$." For example, $x_1$ is the parent of $x_2$. The probability distributions specify the strength of the relationships between variables. For instance, if $x_1$ has two states (true and false), then associated with $x_1$ is a single probability distribution $p(x_1)$ and associated with $x_2$ are two probability distributions $p(x_2|x_1=t)$ and $p(x_2|x_1=f)$.

An important aspect of belief networks is the concept of dependence. Sets of variables x and y are said to be conditionally independent, given a set of variables z, if the probability distribution for x given z does not depend on y. That is, if $p(x|z,y)=p(x|z)$, x and y are conditionally independent given z. If z is empty, however, x and y are said to be "independent" as opposed to conditionally independent. If x and y are not conditionally independent given z, then x and y are said to be conditionally dependent given z.

The arcs in a belief network convey dependence between nodes. When a belief network has an arc from a first node to a second node, the probability distribution of the second node depends upon the value of the first node. For example, belief network 101 contains an arc from node 102 to node 106, and therefore, node 106 is said to be dependent on node 102. Just like the presence of arcs in a belief network conveys dependence, the absence of arcs in a belief network conveys conditional independence. For example, node 102 and node 110 are conditionally independent given node 106. That is, the values of nodes 102 and 110 are conditionally independent if the value of node 106 is known, the condition being the observation of node 106. However, two variables indirectly connected through intermediate variables are dependent given lack of knowledge of the values ("states") of the intermediate variables. Therefore, if the value for $x_2$ is unknown, $x_1$ and $x_3$ are dependent.

FIG. 2 depicts an example belief network for troubleshooting automobile problems. The belief network of FIG. 2 contains many variables 202–234 relating to whether an automobile will work properly and arcs 236–268. A few examples of the relationships between the variables follow: For the radio 214 to work properly, there must be battery power 212 (arc 246). Battery power 212, in turn, depends upon the battery working properly 208 and a charge 210 (arcs 242 and 244). The battery working properly 208 depends upon the battery age 202 (arc 236). The charge 210 of the battery depends upon the alternator 204 working properly (arc 238) and the fan belt 206 being intact (arc 240).

The automobile troubleshooting belief network also provides a number of examples of conditional independence and conditional dependence. The operation of the lights 216 and battery power 212 are dependent, and the operation of the lights 216 and operation of the radio 214 are conditionally independent given battery power. The concept of conditional dependence and conditional independence can be expressed using conditional probability notation. For example, the operation of the lights 216 is conditionally independent of the radio 214 given battery power 212. Therefore, the probability of the lights 216 working properly given both the battery power 212 and the radio 214 is equal to the probability of the lights working properly given the battery power alone, P(Lights|Battery Power, Radio)=P(Lights|Battery Power). Also, the probability of the lights 216 working properly is conditionally dependent on the radio 214 given the battery 208. Therefore, the probability of the lights 216 working properly given both the radio 214 and the battery 208 is not equal to the probability of the lights given the battery alone: P(Lights|Radio, Battety)≠(Lights|Battery).

There are two conventional approaches for constructing belief networks. Using the first approach ("the knowledge-based approach"), a person known as a knowledge engineer interviews an expert in a given field to obtain the knowledge of the expert about the expert's field of expertise. The knowledge engineer and expert first determine the distinctions of the world that are important for decision making in the expert's field of expertise. These distinctions correspond to the variables of the domain of the belief network. The "domain" of a belief network is the set of all variables in the belief network. The knowledge engineer and the expert next determine the dependencies among the variables (the arcs) and the probability distributions that quantify the strengths of the dependencies.

In the second approach ("the data-based approach"), the knowledge engineer and the expert first determine the variables of the domain. Next, data is accumulated for those variables, and an algorithm is applied that creates a belief network from this data. The accumulated data comes from real world instances of the domain. That is, real world instances of decision making in a given field. Conventionally, this second approach exists for domains containing only discrete variables.

A method for generating a belief network that is an improvement over these conventional approaches is described in U.S. Pat. No. 5,704,018, entitled "Generating Improved Belief Networks" assigned to a common assignee, which is hereby incorporated by reference. This improved method uses both expert knowledge and accumulated data to generate a belief network.

After the belief network has been created, the belief network becomes the engine for a decision-support system. The belief network is converted into a computer-readable form, such as a file, and input into a computer system. Then, the computer system uses the belief network to determine the probabilities of variable states given observations, determine the benefits of performing tests, and ultimately recommend or render a decision. Consider an example where a decision-support system uses the belief network of FIG. 2 to troubleshoot automobile problems. If the engine for an automobile did not start, the decision-based system could request an observation of whether there was gas 224, whether the fuel pump 226 was in working order by performing a test, whether the fuel line 228 was obstructed, whether the distributor 230 was working, and whether the spark plugs 232 were working. While the observations and tests are being performed, the belief network assists in determining which variable should be observed next.

SUMMARY OF THE INVENTION

An electronic shopping aid is provided that assists a user in selecting a product from an electronic catalog of products based on their preferences for various features of the products. Since the electronic shopping aid helps a user select a product based on the user's preferences, it is referred to as a preference-based product browser. In using the browser, the user initially inputs an indication of their like or dislike for various features of the products. In addition, the user may optionally input an indication of how strongly they feel about the like or dislike. In addition to or instead of inputting a like or dislike for features of the product, the user may input a like or dislike for one or more of the products, or the user may input a characteristic of themselves, such as their age or income. After receiving this information, the browser then utilizes the information to determine a list of products in which the user is most likely interested. As part of this determination, the browser performs collaborative filtering and bases the determination on what other users with similar characteristics (e.g., age, income, and preference for a product) have liked. After creating this list, the browser displays the list and also displays a list of features which the user has not indicated either a like or a dislike for and which the browser has identified as being most relevant to the determination of the products that the user may like. Thus, by specifying a like or dislike for one or more of these features and products, the user helps the browser to more accurately determine the products in which the user will most likely be interested by having the user state a preference for only those features that the browser deems most important to the determination process.

In accordance with a first aspect of the present invention, a method is provided in a computer system having an electronic shopping aid for predicting a desired product of a user from among available products based on a preference of the user for attributes of the available products. The electronic shopping aid receives a belief network containing attribute nodes and preference nodes, where the attribute nodes reflect the attributes of the available products and where the preference nodes reflect the available products. The electronic shopping aid further receives a request to determine an available product having a greatest likelihood of being the desired product by evaluating probability distributions of the preference nodes given a value of at least one of the attribute nodes and indicates the available product having the greatest likelihood of being the desired product to the user.

In accordance with a second aspect of the present invention, an electronic shopping aid is provided for predicting a desired product of a user based on a preference of the user for attributes of the products. The electronic shopping aid includes a belief network, a receive component, a determination component, and an output component. The belief network contains attribute nodes and preference nodes. The attribute nodes reflect attributes of the products, and the preference nodes reflect the products. Each preference node has a weight that is an indication of how much a value of at least one of the attribute nodes influences whether the available product is the desired product of the user given the value of at least one of the attribute nodes. The receive component receives a request to determine an available product having a greatest likelihood of being the desired product. The request contains a value for at least one of the attribute nodes. The determination component determines the available product having the greatest likelihood of being the desired product by evaluating the weights of the preference nodes given the value of the attribute node. The output component indicates the available product having the greatest likelihood of being the desired product.

In accordance with a third aspect of the present invention, a method is provided in a computer system having a collaborative filtering system for predicting a desired preference of a user based on attributes of the user. The collaborative filtering system receives a belief network containing attribute nodes and preference nodes. The attribute nodes reflect the attributes of the user and have a value. The preference nodes reflect available preferences of the user. Each preference node has a probability indicating the likelihood that the available preference is the desired preference of the user given a value for at least one of the attribute nodes. The collaborative filtering system further receives a request to determine an available preference having a greatest likelihood of being the desired preference, where the request contains a value for at least one of the attribute nodes. Additionally, the collaborative filtering system determines the available preference having the greatest likelihood of being the desired preference by evaluating the probabilities of the preference nodes given the value of the at least one of the attribute nodes or preference nodes, indicates the available preference having the greatest likelihood of being the desired preference, determines which of the attribute nodes are unspecified attribute nodes for which a value was not received in the request, determines an expected value of information for each of the unspecified attribute nodes, and displays to the user the unspecified attribute node with the greatest expected value of information. The expected value of information indicates an importance of a value for the unspecified attribute node in determining the desired preference.

BRIEF DESCRIPTION OF THE DRAWINGS

FIG. 5 depicts the database of FIG. 3 in greater detail.

DETAILED DESCRIPTION OF THE INVENTION

Figure 1:
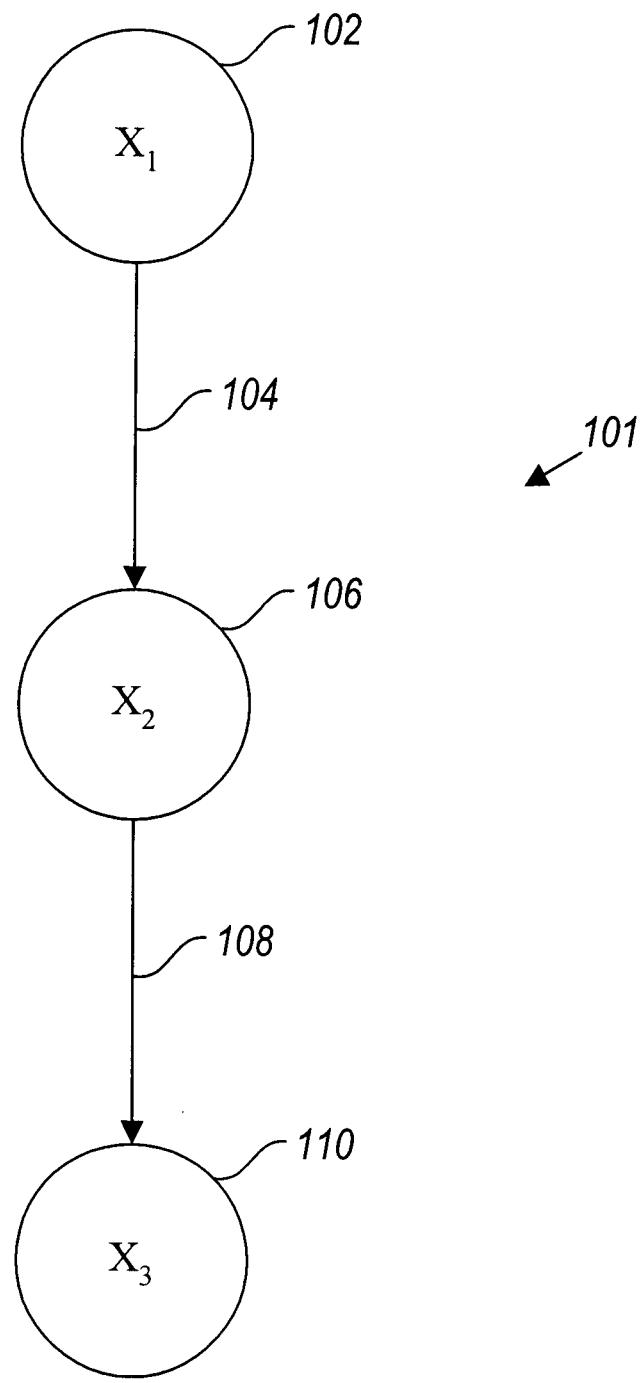
FIG. 1 depicts an example of a conventional belief network.
Figure 2:
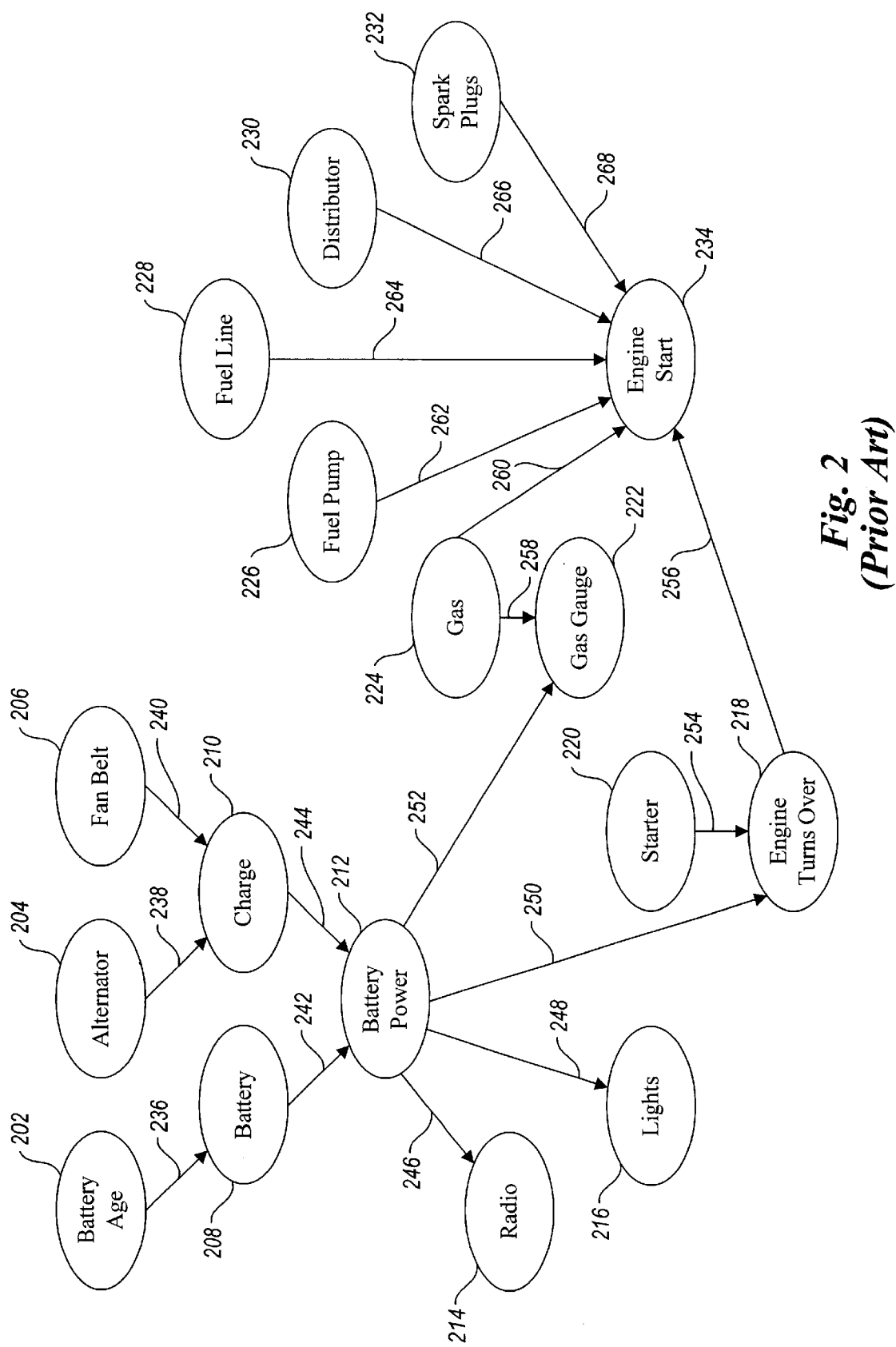
FIG. 2 depicts an example of a conventional belief network for troubleshooting automobile problems.

An exemplary embodiment of the present invention provides a method and system for electronic shopping aid that assists a user in selecting a product from an electronic catalog of products based on their preferences for various features of the products. Since the system helps a user select a product based on the user's preferences, it is referred to as a preference-based product browser. The browser, in one embodiment, includes three phases. In the first optional phase, the user initially inputs an indication of their like or dislike for various features of the products. In addition, the user may optionally input an indication of how strongly they feel about the like or dislike. In addition to or instead of inputting a like or dislike for features of the product, the user may input a like or dislike for one or more of the products, or the user may input a characteristic of themselves, such as their age or income. In the second phase, the browser then utilizes the information collected in the first phase to determine a list of products in which the user is most likely interested. After creating this list, the browser displays the list and also displays a list of features or products which the user has not indicated either a like or a dislike for and which the browser has identified as being most relevant to the determination of the products that the user may like. The user then provides feedback to the browser as to a like or dislike for one or more of these features and products. The browser then creates a new list of products based on added information. The user thus helps the browser to more accurately determine the products in which the user will most likely be interested by having the user state a preference for only those features that the browser deems most important to the determination process. The browser may repeat the process of soliciting user input as to likes and dislikes and creating a new list until a product is selected. In a third optional phase, the system may perform collaborative filtering based on what other users with similar characteristics (e.g., age, income, and preference for a product) have liked to augment the lists of products.

When identifying the list of products in which the user will most likely be interested, the preference-based browser utilizes a belief network, which is sometimes known as a Bayesian network. The preference-based browser "learns" a belief network using both prior knowledge obtained from an expert in selecting the products and a database containing empirical data obtained from many users. The empirical data contains attributes of the users, an indication of their like or dislike for various features of the products, and an indication of their like or dislike for each of the products. After initially learning the belief network, the belief network is relearned at various intervals when either additional characteristics of the user or additional features of the products are identified as having a causal effect on the preferences of the users and data for these additional characteristics or features can be gathered. This relearning allows the belief network to improve its accuracy at predicting desired products of a user. Upon each iteration of relearning, a cluster model is automatically generated which indicates a number of clusters that best predicts the data in the database. After relearning the belief network a number of times, the preference-based browser uses the belief network to predict the preferences of a user using probabilistic inference. In performing probabilistic inference, the preference-based browser receives known attributes of a user as well as the user's like or dislike of various product features or products themselves, and the preference-based browser then accesses the belief network to determine the probability that the user will like each of the products given this information. Based on these probabilities, the set of products most likely to be desired by the user can be predicted.

The method of learning a belief network from both expert data and empirical data before performing probabilistic inference has been used as part of a collaborative filtering system as described in U.S. Pat. No. 5,704,017, entitled "Collaborative Filtering Utilizing a Belief Network," assigned to a common assignee, which is hereby incorporated by reference.

Figure 3:
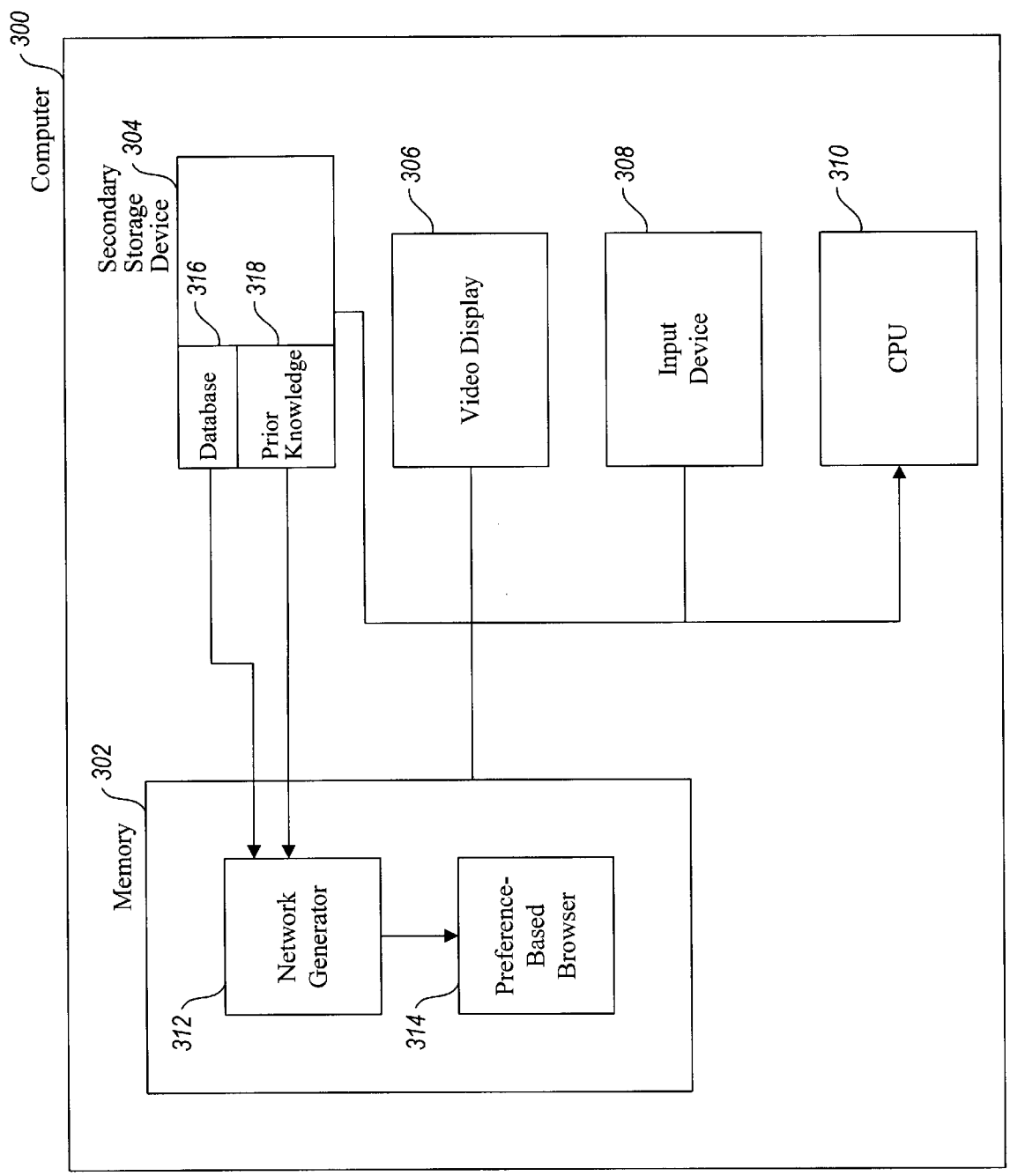
FIG. 3 depicts a computer system suitable for practicing an exemplary embodiment of the present invention.

FIG. 3 depicts a block diagram of a computer 300 suitable for practicing an exemplary embodiment of the present invention. The computer 300 contains a memory 302, a secondary storage device 304, a video display 306, an input device 308, and a central processing unit (CPU) 310. The memory 302 contains a network generator 312 and a preference-based browser 314. The secondary storage device 304 contains a database 316 and prior knowledge 318. The network generator 312 is responsible for generating a belief network based on the prior knowledge 318 and information contained within the database 316. After generating the belief network, the network generator 312 passes the belief network to the preference-based browser 314 which then utilizes the belief network to determine the user's preferences for products. The preference-based browser can be used to browse any type of products, services, items, web sites, documents, etc. In one embodiment, the preference-based browser may be implemented as a web site on the World Wide Web.

Figure 4:
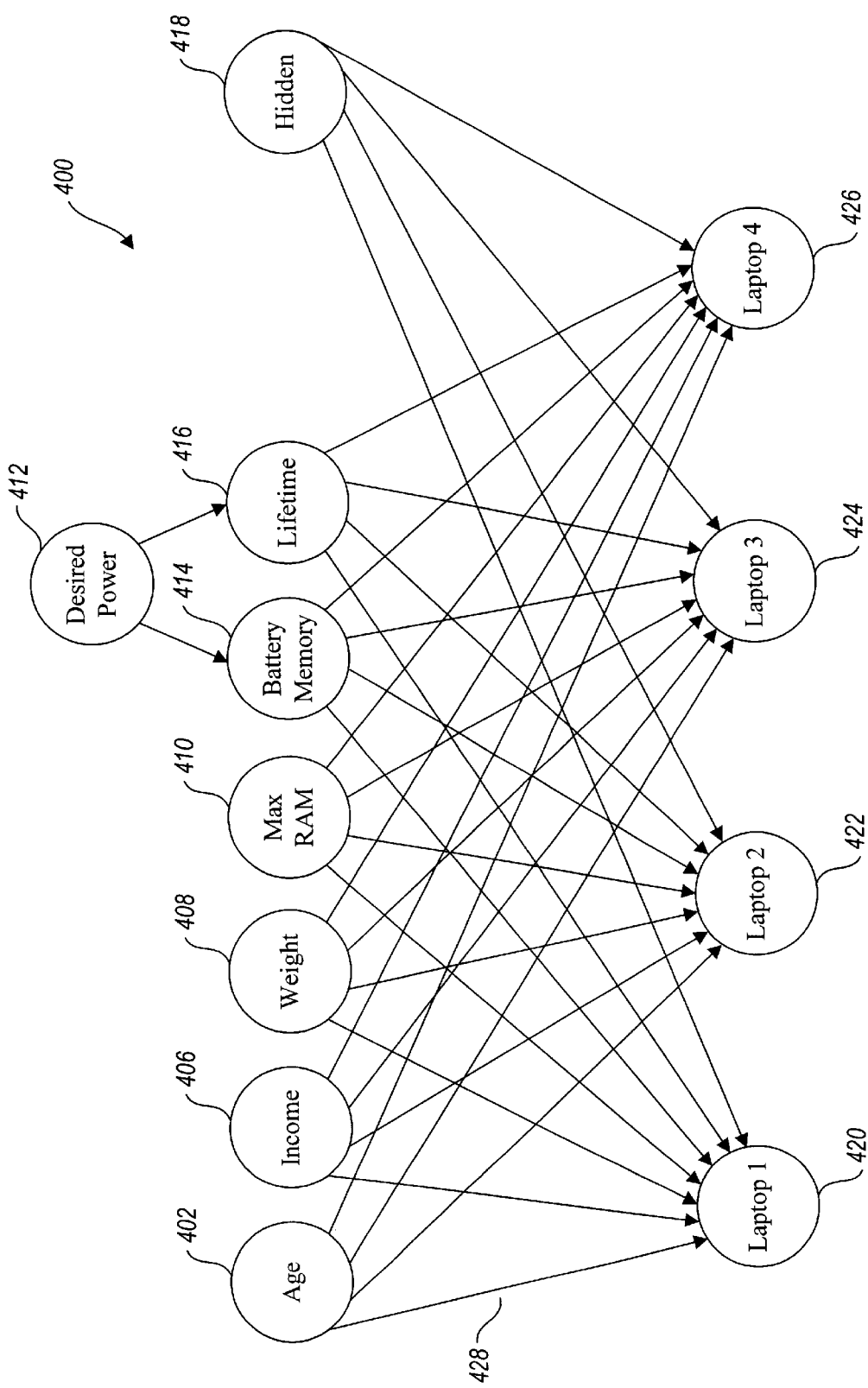
FIG. 4 depicts a belief network that reflects prior knowledge.

The prior knowledge 318 includes a belief network with all variables being binary and with arcs between the variables. FIG. 4 depicts an example belief network 400 utilized by the preference-based browser to determine preferences of a user for a laptop computer. In an exemplary embodiment, belief networks are implemented as an acyclic, directed graph data structure with the variables in the belief network corresponding to nodes in the data structure. The belief network 400 contains a number of variables (or nodes) 402–426. A number of these variables, 402–416, reflect causal attributes and are sometimes referred to as causal variables. A "causal attribute" is an attribute that has a causal effect on caused attributes. A causal attribute includes both demographic information, which are various characteristics of the users (i.e., buyers) like age and income, and features or attributes of the products, like weight and maximum amount of random access memory (RAM) that the laptop can utilize.

The caused attributes in the belief network 400 are reflected by variables 420–426. These variables are known as caused attributes (or caused variables) because their value is causally influenced by the causal variables. Caused attributes can be of two types: preference caused attributes or non-preference caused attributes. Preference caused attributes contain the preferences (or products) to be predicted. Non-preference caused attributes are causally influenced by the causal attributes, but are not preferences because the system is not used to predict their value. For example, in the belief network 400 which is designed to assist a user in selecting a laptop computer, a non-preference caused attribute may be whether that user owns a BMW automobile. Variable 420 is an example of a preference caused attribute that indicates whether a particular user likes laptop 1, and variable 402 is an example of a causal attribute whose value has a causal effect on variable 420. That is, the age of the buyer influences whether the buyer will like laptop 1. For instance, assuming laptop 1 has enhanced graphics capabilities, a younger person may like laptop 1 because they are interested in using the computer to play video games, requiring the computer to have fast graphics capabilities. Conversely, an older person may not be interested in laptop 1 because they will use the computer as a business tool where the graphics capabilities may be less important.

To help facilitate the input of information, the belief network 400 contains a hierarchical causal attribute 412 that causally influences the value of two causal attributes 414 and 416. A hierarchical causal attribute facilitates the input of information because, for example, the user may not care about the particular features of the power supply (e.g., whether the battery has memory), but is instead only interested in selecting the laptop with the least expensive power supply. In this situation, the user can designate a value of "cheap" for the desired power and both the battery memory variable 414 and the lifetime variable 416 will receive a value that is consistent with a cheap power supply: the battery memory variable will indicate that memory is requested, and the lifetime variable will indicate a short lifetime. When providing an observation or value for desired power, the user may also indicate a value for one of the nodes that it causally influences 414 or 416, but they may not provide an observation for both.

The belief network 400 also contains a hidden causal attribute 416, which is sometimes referred to as a hidden causal variable. A hidden causal attribute is a factor that is believed to causally influence the caused attributes, but which is unobserved. That is, the administrator that created the belief network believes that an unobserved factor exists that is not currently identified. For example, the administrator may believe that another factor such as education may also have a causal effect on whether someone likes laptop 1, but until the administrator can verify this belief, the factor remains unobserved. The process of verifying the existence of a factor is further discussed below.

The prior knowledge 318 is used to indicate which variables in the belief network 400 are causal attributes, hidden causal attributes, and caused attributes. In addition, the prior knowledge 318 is used to determine which causal attribute affects a caused attribute by indicating an arc from the causal attribute to the caused attribute. For example, arc 428 indicates that the causal attribute age 402 has an effect on whether a buyer may like laptop 1.

In the belief network 400, all of the variables are binary and consequently have a value of either 0 or 1. In addition, the probability that a variable $S_i$ is equal to 1 given its parents is given by the following equation:

$$P(S_i = 1 \mid pa(S_i)) = \sigma\left(\sum_j J_{ij}S - j + h_i\right)$$

where i indicates a node (e.g., product) and j indicates a parent node of the ith node (e.g., a feature), where $J_{ij}$ are the weights or strengths of a connection between the node i and the parent node j, where $S_j$ is the current value of the parent node j, where $h_i$ is the bias for the caused attribute (e.g., product) represented by the node i, and where σ is the Sigmoid function. The weights $J_{ij}$ represent, for example, how important the causal attribute is to liking the particular product. The weights $J_{ij}$ can hold any value between −∞ and ∞. The term $h_i$ is the bias, which is the logarithm of the likelihood that a buyer likes a particular product, even though the product has none of the features that the buyer likes. In the above equation, the sum over j ranges over the parents of variable $S_i$, and the Sigmoid function is defined as follows:

$$\sigma(z) = \frac{1}{1 + e^{-z}}$$

Therefore, the belief network 400 is a Sigmoid belief network. In addition, if $S_j$ corresponds to feature j, then $J_{ij} = \alpha_{ij} * \alpha_j$ for all products, where "α," scales how important the feature is to all products and where α is defined as follows. The various likes and dislikes for features as indicated by a user are represented as $\alpha_{ij}$ values. The variables $\alpha_{ij}$ are defined by the node type of $S_j$. There are four node types: less_than, greater_than, around, and categorical. Less_than means that the user wants the attribute to have a value less than some threshold $T_{lt}$. Greater_than means that the user wants the attribute to have a value more than threshold $T_{gt}$. Around, means the user wants the attribute to have a value in between $T_1$ and $T_2$. Categorical means the user wants the attribute (a categorical variable) to have exactly the specified value T. Finally, associated with each product is the attribute value for that product x. The constants $\alpha_{ij}$ are defined as follows:

$$\text{Less than:} \quad \alpha_{ij} = \begin{cases} 1 & \text{if } x < T_{lt} \\ \exp\{(-x + T_{lt})/\beta_{lt}\} & \text{otherwise} \end{cases}$$

$$\text{Greater than:} \quad \alpha_{ij} = \begin{cases} 1 & \text{if } x > T_{gt} \\ \exp\{(x - T_{gt})/\beta_{gt}\} & \text{otherwise} \end{cases}$$

$$\text{Around:} \quad \alpha_{ij} = \begin{cases} 1 & \text{if } T_1 \geq x \geq T_2 \\ \exp\{(-x - T_1)/\beta_1\} & \text{if } x \leq T_1 \\ \exp\{(x - T_2)/\beta_2\} & \text{if } x \geq T_2 \end{cases}$$

$$\text{Categorical:} \quad \alpha_{ij} = \begin{cases} 1 & \text{if } x = T \\ 0 & \text{otherwise} \end{cases}$$

where the β's are decay constants. Note that, if $\alpha_{ij} \leq 0.01$, then the arc from node j to node i may be removed. Those practiced in the art will recognize that there are many alternatives to the above functions. At construction time, the belief network is assigned default values for $T_{lt}$, $T_{gt}$, $T_1$, $T_2$, T and the β's. However, the user may override these values at runtime.

In addition to providing the belief network 400, as part of the prior knowledge 318, an administrator also supplies both a prior probability that indicates the administrator's level of confidence that the belief network adequately predicts the preferences of the user and a range of a number of states for any hidden variables in the belief network 400. For example, the administrator may indicate that the hidden variable 418 contains between five and ten states based on their own knowledge. Each of these states corresponds to a cluster of users in the database that have similar preferences, which is discussed in more detail below. An exemplary embodiment determines which number of these states most accurately reflects the data in the database 316. In other words, an exemplary embodiment will determine a number within the range that is the best grouping of clusters in the database 316 using a method described below.

FIG. 5 depicts the database 316 in greater detail. The database 316 contains a number of records 502, 504, and 506 which are each referred to as a case. One skilled in the art will appreciate that although three cases are depicted, the database 316 will usually contain many more cases. Each case 502, 504, 506 indicates observed data for a particular user. Each case typically contains a value for each variable in the belief network 400 except for the hidden causal attributes. For example, case 502 reflects a user who is a child (e.g., <18 years of age), who has a low income (e.g., <$20,000), and who has an interest in a heavy laptop (>5 lbs) with maximum RAM less than 32 Megabytes and with the cheapest power supply available (e.g., a battery with a short life of less than 12 hrs and with memory). The buyer reflected by case 502 liked both laptop 1 and laptop 2 and disliked both laptop 3 and laptop 4. In some situations, a value for a variable will be missing from a case. This may occur, for example, when an attribute is not observed for a user. In this situation, during the processing of an exemplary embodiment, the missing value is factored into the calculations described below. It should be noted that desired power is a hierarchical causal attribute that assists a user in entering information. For example, when the user wants the least expensive laptop possible, they merely enter "cheap" for desired power and do not specify values for the causal attributes that depend from the desired power (i.e., battery memory and lifetime). Alternatively, the user may ignore the desired power and enter a value for both battery memory and lifetime, as shown in case 504.

Figure 6:
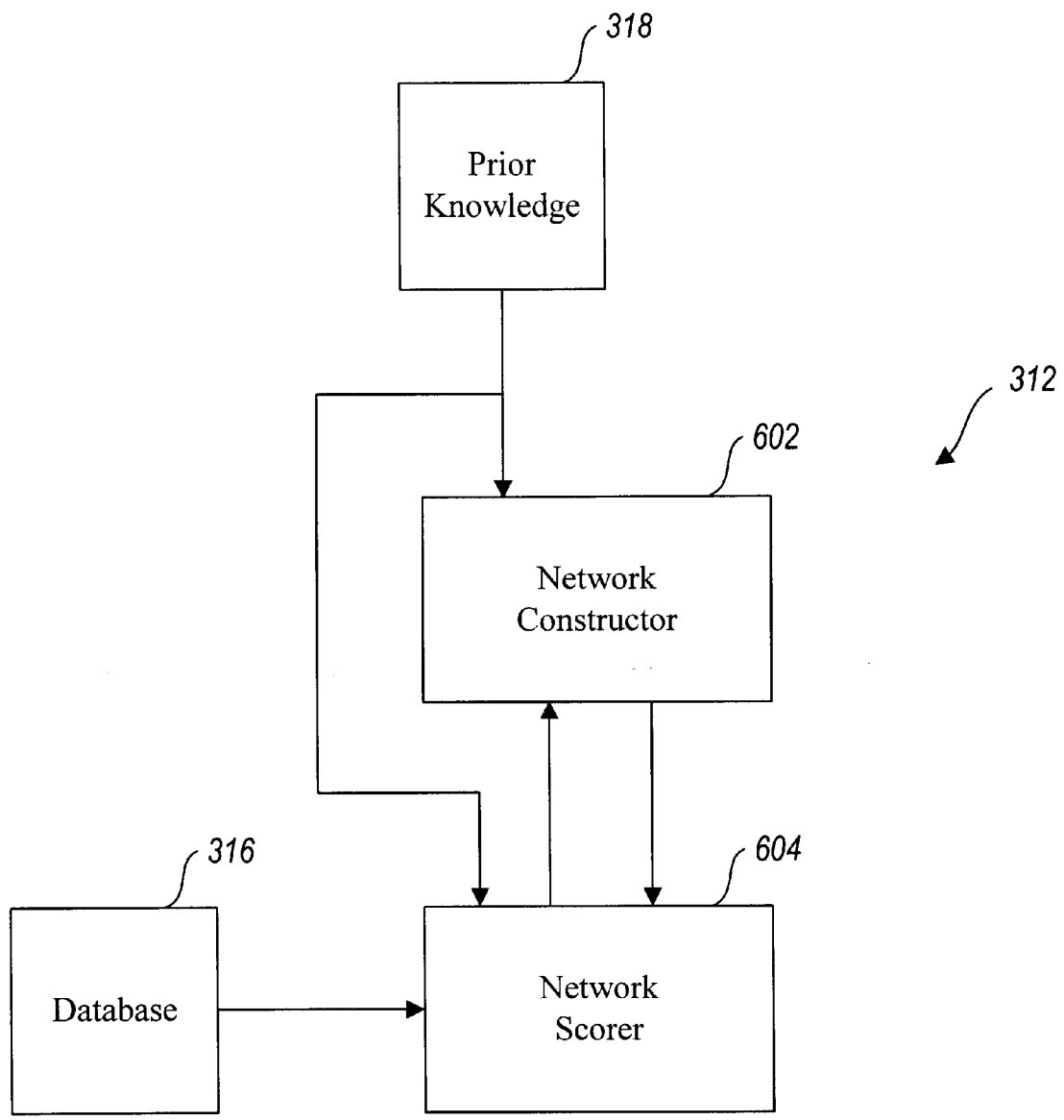
FIG. 6 depicts the network generator of FIG. 3 in greater detail.

FIG. 6 depicts the network generator 312 in greater detail. The network generator 312 comprises a network constructor 602 and a network scorer 604. The network constructor 602 receives the prior knowledge 318 and constructs a belief network for each combination of hidden causal attributes and their states. For example, if the prior knowledge indicates the hidden variable may have 5–10 states, then the network constructor 602 constructs six belief networks: a belief network with a hidden variable with five states, a belief network with a hidden variable with six states, etc. After generating each belief network, the network constructor 602 sends each belief network to the network scorer 604 which scores the belief network for goodness in predicting preferences of a user by utilizing the data in the database 316. For example, the network scorer 604 may determine that the belief network with a hidden variable having five states is the best. After scoring each belief network, the network scorer 604 sends the scores to the network constructor 602 which sends a belief network with the best score to the preference-based browser 314 for use in predicting preferences of a user.

As previously stated, the exemplary embodiment first learns a belief network and then performs probabilistic inference using the belief network. This learning process is performed by an administrator first generating the prior knowledge through the construction of an initial belief network with at least one hidden variable, creating the prior probability, and identifying a range of a number of states for the hidden variable. After generating the prior knowledge, the administrator iterates through a process in the system which improves the accuracy of the belief network.

Figure 7:
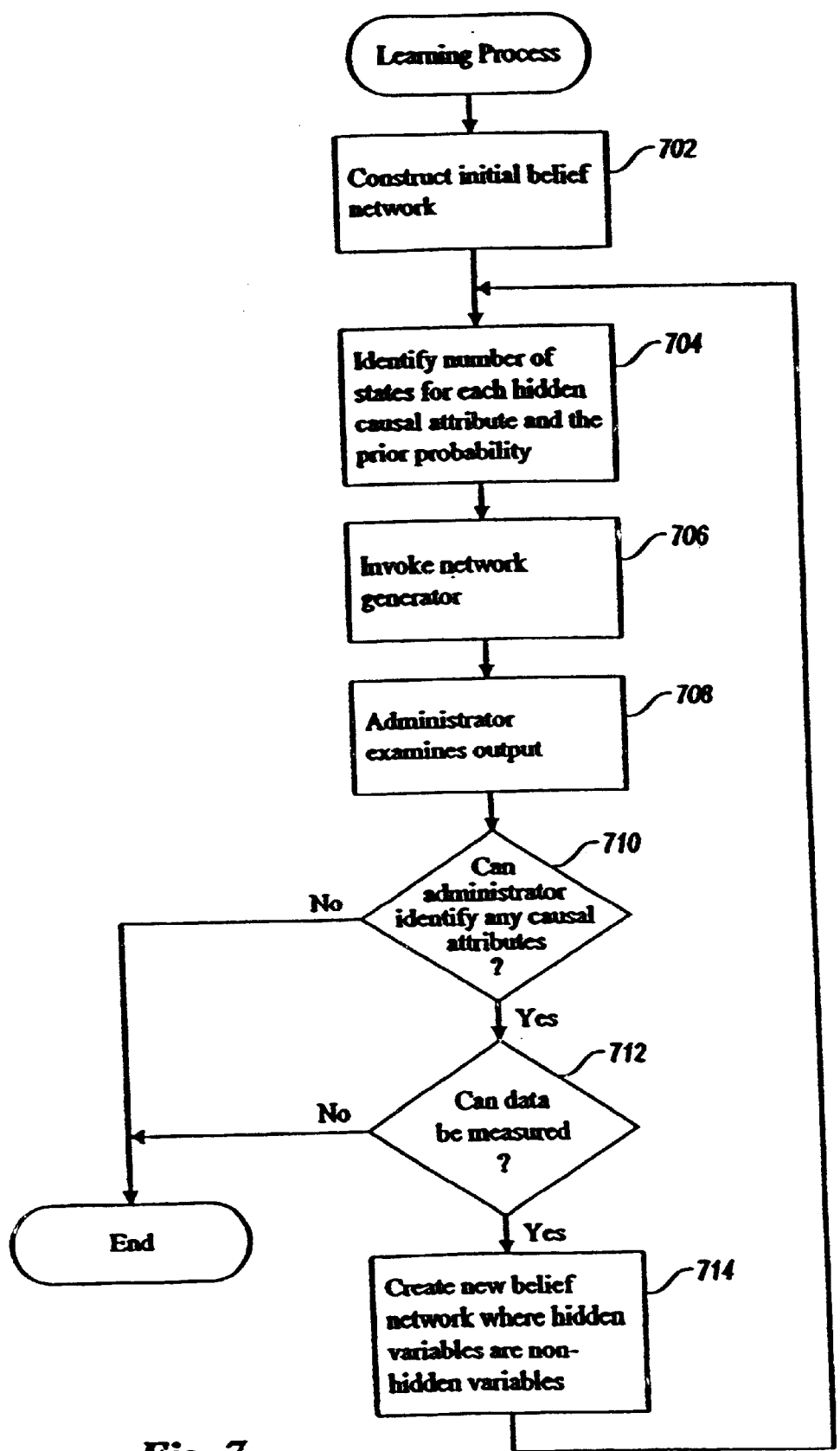
FIG. 7 depicts a flowchart of the steps performed when learning a belief network to be utilized in the preference-based browser of FIG. 3.
Figure 8:
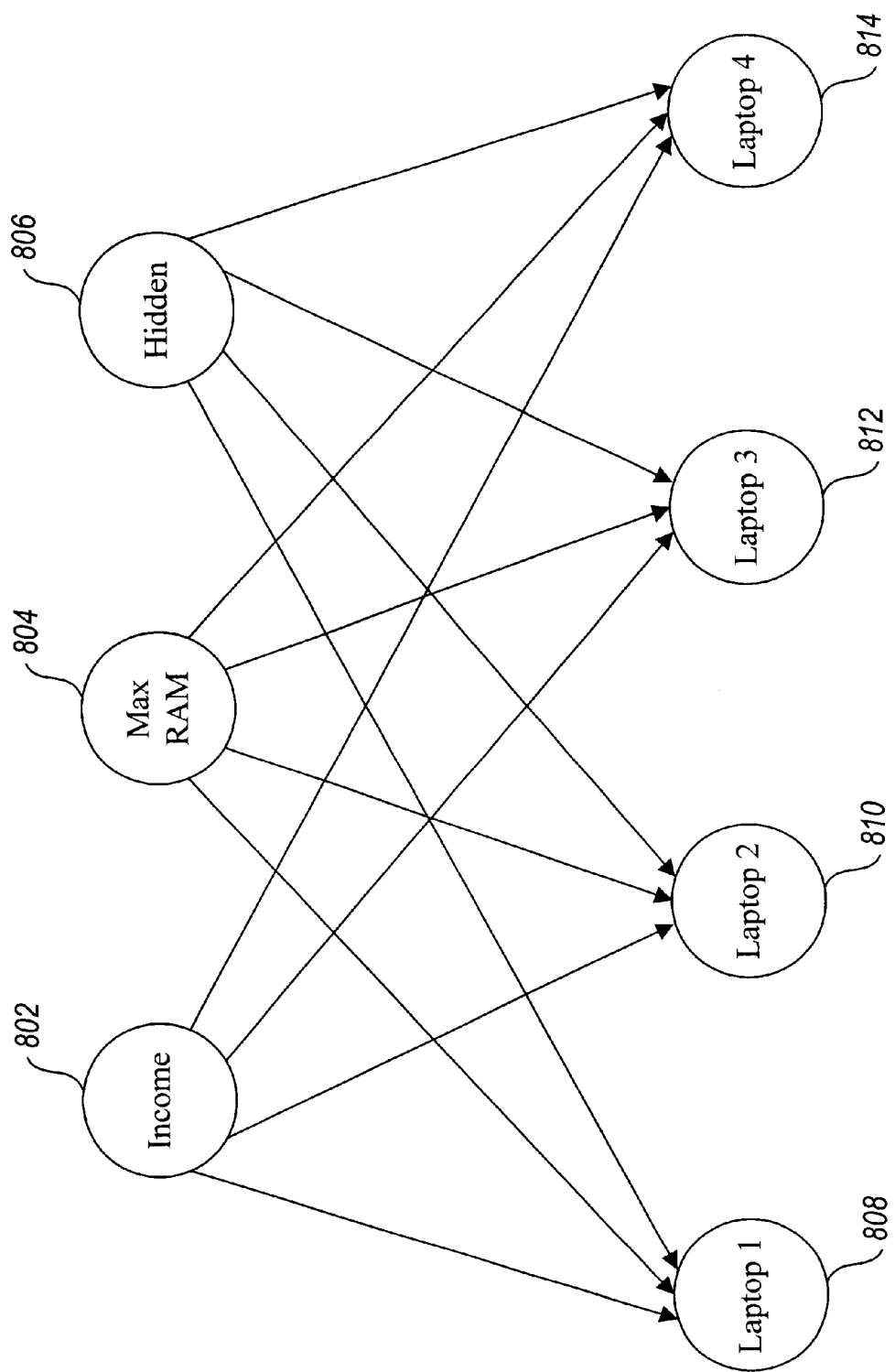
FIG. 8 depicts an initial belief network to be used in the learning process of FIG. 7.

FIG. 7 depicts a flowchart of the steps performed during the learning process. The first step performed in the learning process is for the administrator to construct an initial belief network (step 702). In this step, the administrator determines the available preferences or products that the system may choose for a user (e.g., laptop 1, laptop 2, laptop 3, and laptop 4). Then, the administrator consults with an expert to determine any causal attributes that have a causal effect on the preferences and for which data (or observations) are available. For example, the observations may be derived from a buyers' survey which indicates various demographic information for a number of buyers and the products that these buyers selected. After receiving this information, the administrator constructs an initial belief network with causal attributes, caused attributes, and at least one hidden attribute, like the one shown in FIG. 8. The initial belief network 800 contains causal attributes 802 and 804, a hidden causal attribute 806, and caused attributes 808–814 that reflect the preferences for products to be predicted by the preference-based browser. One skilled in the art will appreciate that the initial belief network may contain additional nodes, additional levels of nodes, or additional arcs between the nodes. In many situations, however, the causal attributes are not known at this time, and therefore, the learning process begins with an initial belief network that is empty.

The preference-based browser 314 provides user interactive functionality to assist the user in the creation of the belief network. This functionality allows a user to create nodes and arcs in a belief network by using the input device 308. The belief network is displayed in a graphical form to the user on the video display 306. As the user creates the belief network by manipulating the input device 308, the preference-based browser 314 creates an acyclic directed graph data structure to represent the belief network and creates nodes in the acyclic directed graph data structure to represent variables in the belief network. The arcs in the belief network are implemented as arcs in the acyclic directed graph data structure.

After constructing the initial belief network, the administrator identifies the number of states for each hidden causal attribute, identifies the prior probability, and sets the weights (i.e., $J_{ij}$) to an initial value for each causal attribute and caused attribute (step 704). In this step, the administrator provides a range of the number of states that the administrator believes will indicate the number of clusters within the database for each hidden variable. Additionally, the administrator provides both the prior probability, which is an estimate of their level of confidence in the structure of the belief network, and the weights, which indicate the importance of each attribute node (e.g., feature) to each preference node (i.e., product). Next, the network generator 312 is invoked and passed an initial belief network, the range of the number of states for each hidden causal attribute, and the prior probability (step 706). The network generator determines which of the states of the hidden causal attribute 802 best predicts the data in the database. The network generator performs its functionality by invoking the network constructor to create all combinations of possible belief networks and then by invoking the network scorer to determine which of these belief networks has the best score. The belief network with the best score is then identified and output. This belief network contains a hidden causal attribute with a number of states. The number of states of the hidden causal attribute reflects the number of clusters that best predicts the data. After invoking the network generator, the administrator examines the identified belief network and the cluster for each state of the hidden causal attribute (step 708). Each cluster (state) reflects a ranking of the preference nodes for each state of the hidden causal attribute. For example, assume that the prior knowledge included a range of between two and four states for the hidden causal attribute 802. Further, assume that the network generator selected the belief network with two states for the hidden causal attribute as the one that best predicts the data. In this example, the cluster output ("the cluster model") would be similar to that shown in FIG. 9.

Figure 9:
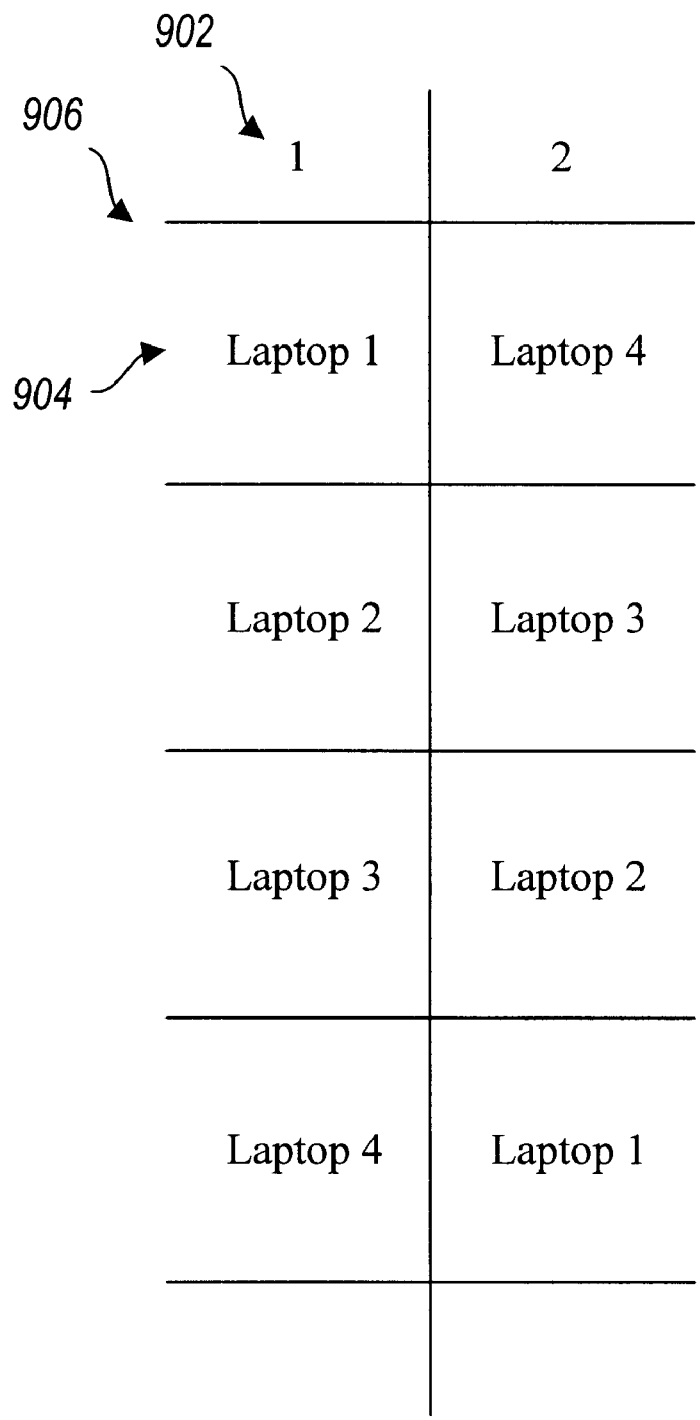
FIG. 9 depicts a cluster model that is output by the network generator of FIG. 3.

FIG. 9 depicts an example cluster model 900 where the number of states is indicated on the top row 902. Under each state is a ranked listing of the preferences 904 of the users within that cluster. For example, in cluster number 1, the users most liked laptop 1 and least liked laptop 4. After examining the output of the clusters, the administrator determines whether they can identify any causal attributes (step 710). In this step, the administrator examines the cluster model to determine if they can identify any causal attributes based on their knowledge. For instance, the administrator may know that laptop 4 has the most expensive power source and laptop 1 has the least expensive power source, and as such, the administrator may determine that one causal attribute is probably the cost of the power source since cluster 1 most liked laptop 1 and least liked laptop 4 and since cluster 2 most liked laptop 4 and least liked laptop 1. In this example, the administrator has been able to identify power source cost as a causal attribute. However, sometimes the administrator may be unable to identify any causal attributes and, in this case, processing ends.

If the administrator is able to identify one or more causal attributes, processing continues to step 712 where the administrator determines whether data can be measured for the identified causal attributes (step 712). In the example, where power source cost has been determined to be a causal attribute, data can be gathered. That is, a survey can be taken to determine which laptops are liked and which are disliked by buyers having a preference for the cost of the power supply. If the data cannot be measured, processing ends.

However, if the data can be measured, a new belief network is created where the hidden causal attributes are converted into non-hidden causal attributes (step 714). In the continuing example, based upon the clustering output of FIG. 9, the administrator may change the initial belief network depicted in FIG. 8 to add the desired power, battery memory, and lifetime causal attributes contained in the belief network depicted in FIG. 4. When creating the belief network, the administrator makes each newly added causal attribute into a binary variable. Although each causal attribute in an exemplary embodiment is binary, one skilled in the art will appreciate that other types of causal variables can be used. Making each newly added causal attribute into a binary variable is easy when the causal attribute is inherently binary (e.g., gender). However, this step becomes a little more difficult when there is more than one causal attribute identified and these causal attributes (e.g., age) can have more than two states. In this situation, the administrator chooses values for the causal attribute based on common sense knowledge. For example, if the administrator knows the laptop is used for a different purpose depending on the user's age and the administrator also knows that the purpose only differs between adults and children, the administrator may choose two states for the age variable (e.g., <18 and >=18).

After creating the new belief network, processing continues to step 704 where the administrator identifies a number of states for each of the hidden variables. Steps 704 to 714 continue until either the administrator cannot identify any causal attributes or data cannot be measured. Upon the occurrence of either of these two events, the resulting belief network is passed to the preference-based browser for rendering probabilistic inferences.

Figure 10:
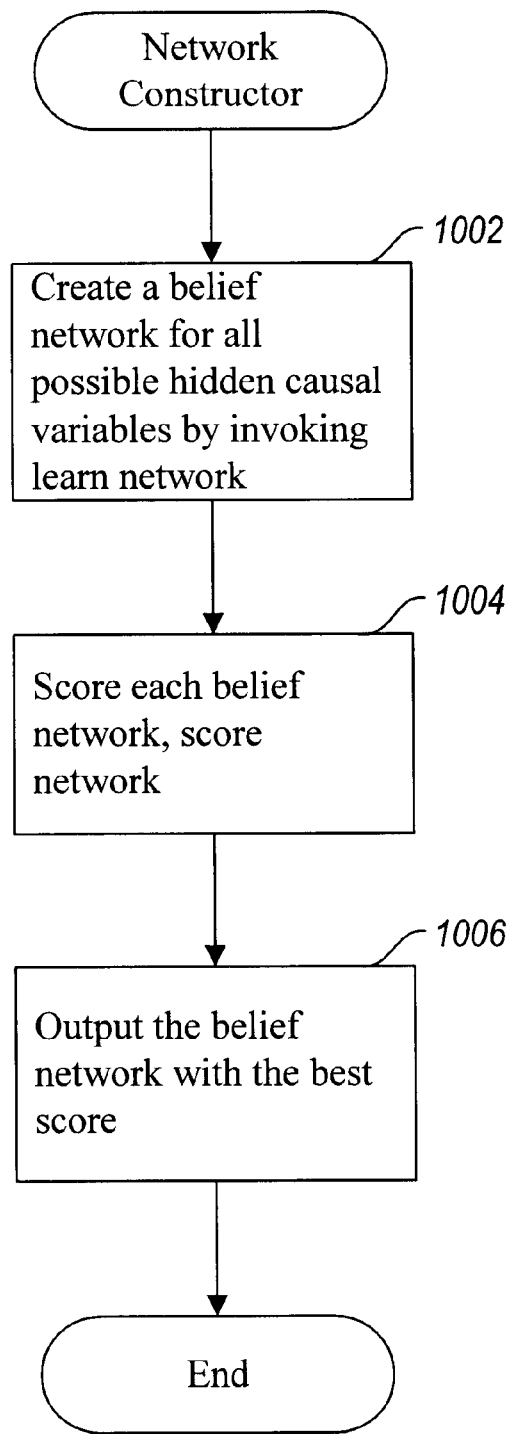
FIG. 10 depicts a flowchart of the steps performed by the network constructor of FIG. 6.

FIG. 10 depicts a flowchart of the steps performed by the network constructor of an exemplary embodiment. The network constructor creates all possible belief networks based on the possible number of hidden causal attributes. The network constructor then invokes the network scorer to determine which of the belief networks has the best score. The first step the network constructor performs is to create a belief network for each possible number of hidden causal attributes (step 1002). For example, if three hidden causal attributes are possible, a belief network containing 0, 1, 2, and 3 hidden causal attributes are created in this step. After creating the belief networks, the network constructor invokes the network scorer to render a score for each of the belief networks (step 1004). The processing of this step is discussed in greater detail below. After receiving the scores for each belief network, the network constructor outputs the belief network having the best score (step 1008). The user may then use the belief network to output the cluster model by selecting each state of the hidden causal variable. The selection of each state of the hidden causal variable will generate a ranked listing of the preferences (i.e., an indication of a cluster).

In one embodiment, the system of the present invention uses techniques as described in U.S. Pat. Nos. 5,704,017 and 5,704,018, which are incorporated by reference, for scoring. However, the calculation of scores using such techniques is too time consuming (e.g., exponential) to be practical for networks with a large number of nodes and arcs. Thus, in one embodiment, the system uses a technique to calculate a score in less than exponential time. Recall that by Bayes' rule, the conditional probability p that product P is the desired product given observations X is given by:

$$p(P=1 \mid X) = \frac{p(P=1, X)}{p(X)}$$

That is, the probability p that product P is the desired product given observations X is the joint probability that the product P is the desired product and that the observations X occurs divided by the probability of observations X occurring. The system approximates the log-likelihood of an event V using a mean-field algorithm as described in Saul et al., *Mean Field Theory for Sigmoid Belief Networks*, Journal of Artificial Intelligence Research 4 (1996), at 61–76 (which is hereby incorporated by reference) to approximate the numerator and denominator of the above equation with their lower bounds. Below, it is described how to use the mean-field algorithm of Saul et al. to compute a lower bound for the log-likelihood (i.e., log p(V)) of a set of observations V. To obtain the numerator in this equation, V is set to (P=1,X). To obtain the denominator in this equation, V is set to X.

With $L_V$ denoting the lower bound for the log p(P), $L_V$ can be written as a function of parameters $\mu_i$ and $\xi_i$ as shown in the following equation:

$$L_V = \sum_{ij} J_{ij}\mu_i\mu_j + \sum_i h_i\mu_i - \sum_i \xi_i\left(\sum_j J_{ij}\mu_j + h_i\right) - $$
$$\sum_i \ln\langle e^{-\xi_i z_i} + e^{(1-\xi_i)z_i}\rangle + \sum_i [\mu_i\ln\mu_i + (1-\mu_i)\ln(1-\mu_i)]$$

where $$z_i = \sum_j J_{ij}S_j + h_i$$

and where the expectation values are given by:

$$\langle e^{-\xi_i z_i}\rangle = e^{-\xi_i h_i}\prod_j [1 - \mu_j + \mu_j e^{-\xi_i J_{ij}}]$$

$$\langle e^{(1-\xi_i)z_i}\rangle = e^{(1-\xi_i)h_i}\prod_j [1 - \mu_j + \mu_j e^{(1-\xi_i)J_{ij}}]$$

The parameters $\mu_i$ and $\xi_i$ are initialized to random values. After calculating the lower bound using the random values for $\mu_i$ and $\xi_i$ the system updates $\xi_i$ for fixed $\mu_i$ for each node i This involves N independent minimizations over the interval [0, 1], where N is the number nodes in the network. This can be done by any number of standard methods (e.g., Press et al., *Numerical Recipes in C*, Cambridge University Press (1992)). After performing this step, the system updates $\mu_i$ for fixed $\xi_i$ for each unobserved node i This is performed by iterating the mean field equation:

$$\mu_i = \sigma\left(h_i + \sum_j [J_{ij}\mu_j + J_{ji}(\mu_j - \xi_j) + K_{ij}]\right)$$

where $K_{ij}$ is given by the following equation:

$$K_{ij} = \frac{(1-\phi_i)(1-e^{-\xi_i J_{ij}})}{1 - \mu_j + \mu_j e^{-\xi_i J_{ij}}} + \frac{\phi_i(1-e^{(1-\xi_i)J_{ij}})}{1 - \mu_j + \mu_j e^{(1-\xi_i)J_{ij}}}$$

and where $\phi_i$ is given by the following equation:

$$\phi_i = \frac{\langle e^{(1-\xi_i)z_i}\rangle}{\langle e^{-\xi_i z_i} + e^{(1-\xi_i)z_i}\rangle}$$

This iteration occurs until the values $\mu_i$ converge, which can be measured by convergence of $L_V$. After the iteration completes, the system then calculates $L_V$. The system determines whether there is a marginal difference between the old lower bound $L_V$old and the new lower bound $L_V$new. This determination is expressed as follows:

$$\frac{L_v\text{new} - L_v\text{old}}{L_v\text{new}} < 10^{-3}$$

If the difference is not marginal, then the lower bound has not yet converged and the system repeats the process to calculate new values for $\mu_i$, $\epsilon_i$, and $\phi_i$. If, however, difference is marginal, then $L_V$new represents the lower bound and the values the values of $\mu_i$, $\epsilon_i$, and $\phi_i$ for each i into the corresponding preference nodes.

Figure 11:
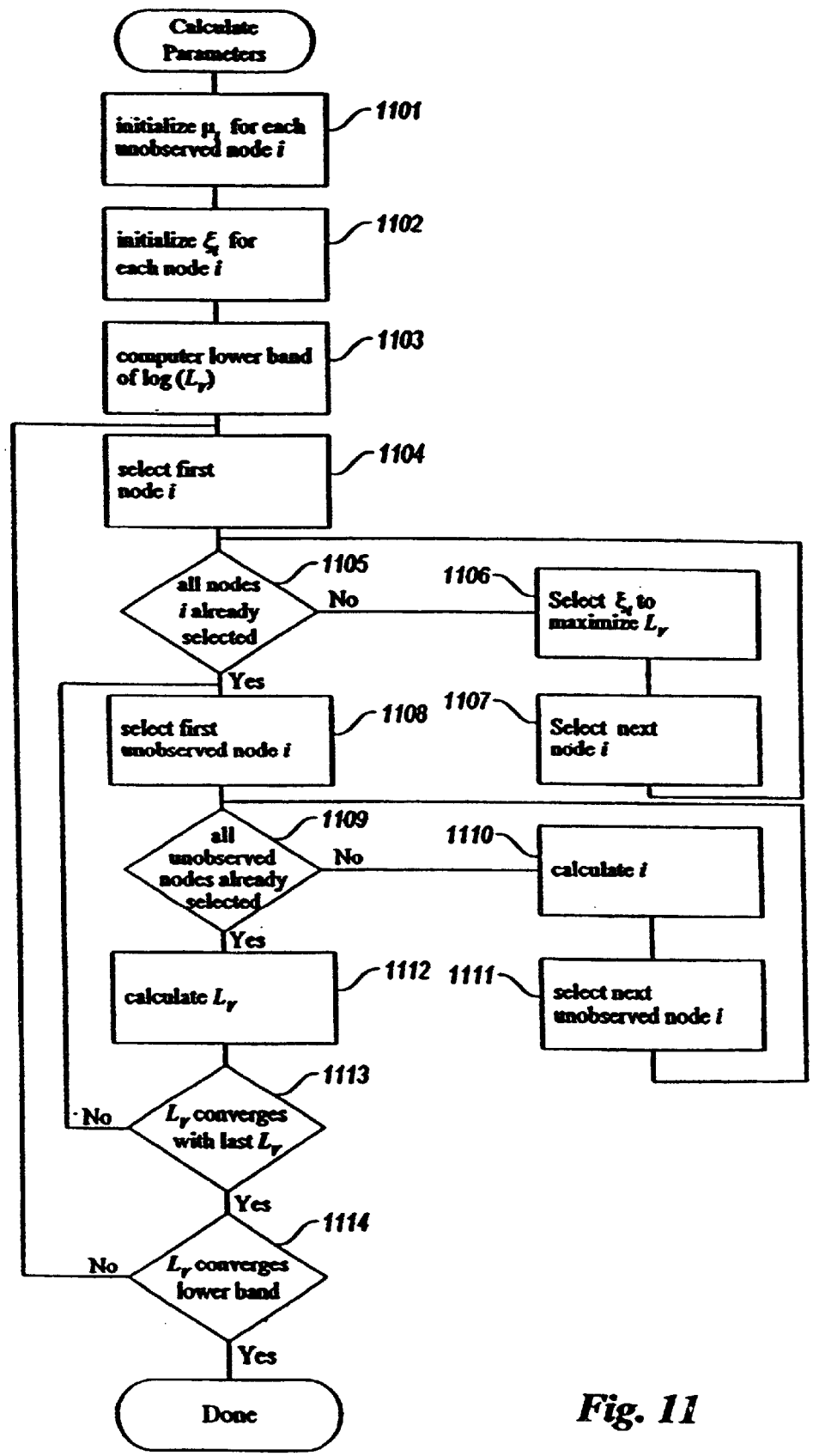
FIG. 11 is a flow diagram of a routine to calculate certain parameters.
Figure 11A:
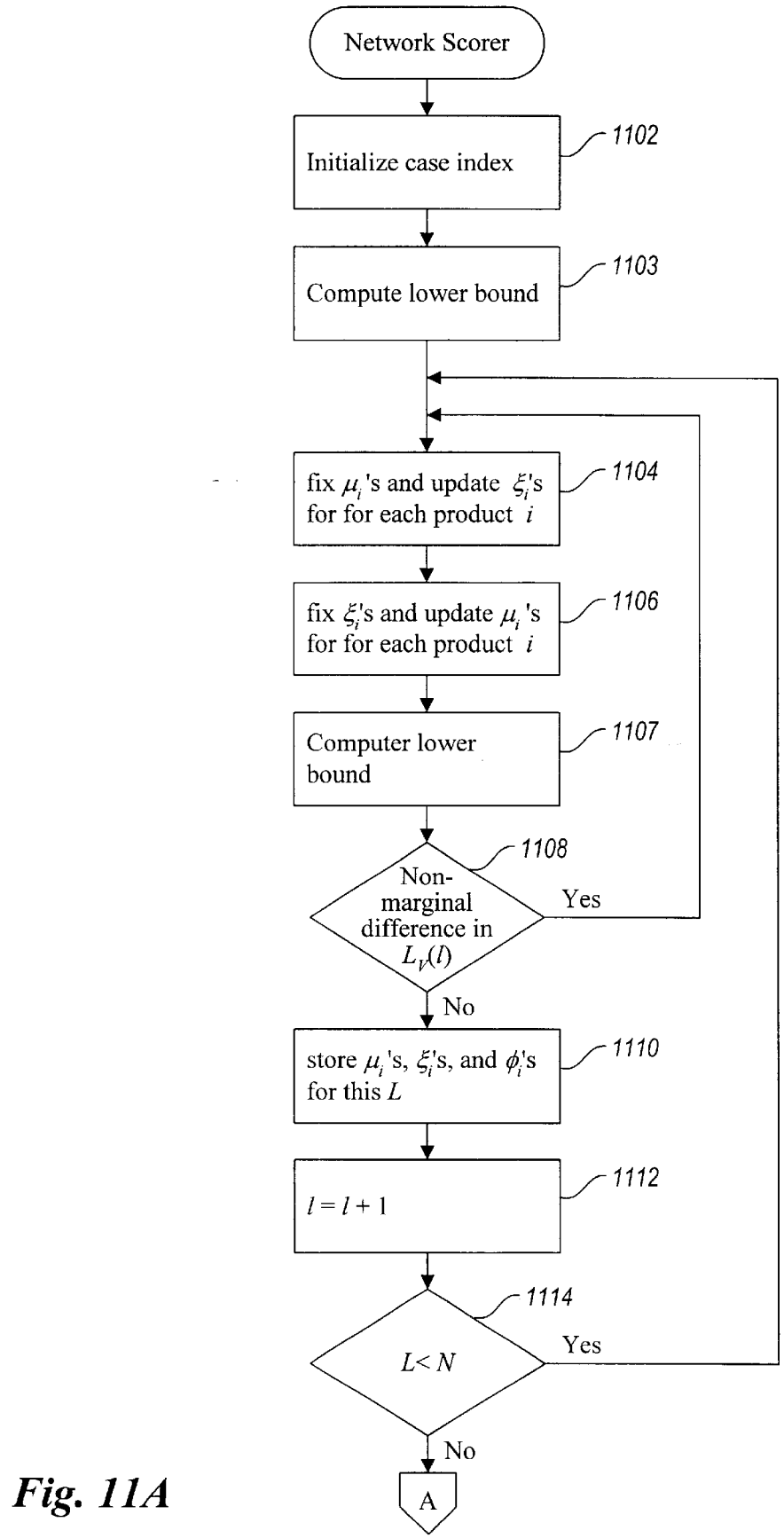
Figure 11B:
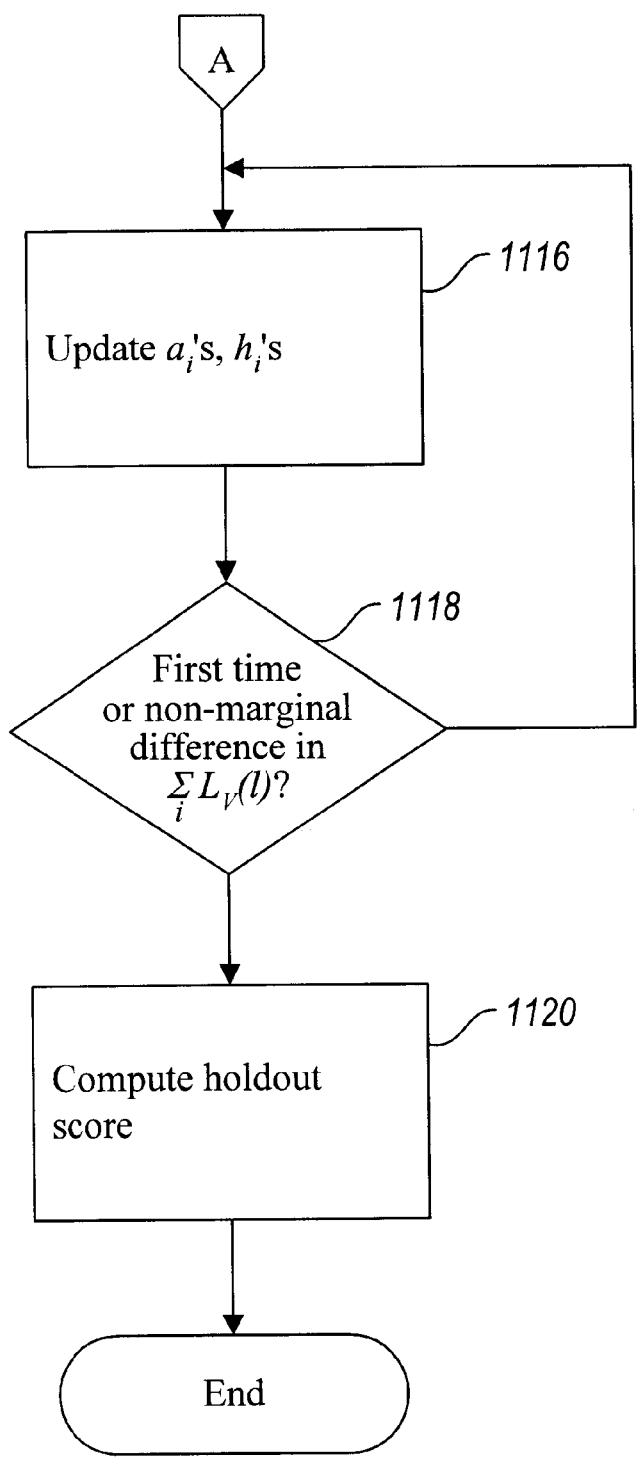

The system uses this technique for calculating the parameter $\mu_i$, $\epsilon_i$, and $\phi_i$ for both learning the belief network and for conducting inference using the belief network. FIG. 11 is a flow diagram of the routine to calculate the parameters. This routine is passed a set of observations V and returns the values $\mu_i$, $\epsilon_i$, and $\phi_i$ for each node for that case. In step 1101, the routine initializes $\mu_i$ for each unobserved node i to a random value. In step 1102, the routine initializes $\epsilon_i$ for each node i to a random value. In step 1103, the routine calculates $L_V$. In steps 1104–1114, the routine loops recalculating $L_V$ until its value converges. In steps 1104–1107, the routine loops selecting a value $G_i$ for each node to maximize $L_V$. In step 1104, the routine selects the first node i. In step 1105, if all nodes i have already been selected, then the routine continues at step 1108, else the routine continues at step 1106. In step 1106, the routine selects the value $\xi_i$ to maximize $L_V$. In step 1107, the routine selects the next node i and loops to step 1105. In steps 1108–1111, the routine loops calculating the value $\mu_i$ for unobserved nodes until $L_V$ converges. In step 1108, the routine selects the first unobserved node i. In step 1109, if all unobserved nodes have already been selected, then the routine continues at step 1112, else the routine continues at step 1110. In step 1110, the routine calculates a value for $\mu_i$ for the selected unobserved node i. The values $\phi_i$ need only be calculated once and do not change with each iteration of this loop. In step 1111, the routine selects the next unobserved node i and loops to step 1109. In step 1112, the routine calculates a value for $L_V$ based in the newly calculated values $\mu_i$. In step 1111, if the value for $L_V$ converges to the last calculated value for $L_V$, then the routine continues at step 1114, else the routine loops to step 1108 to calculate new $\mu_i$ values. In step 1114, if the value of $L_V$ converges to the value calculated when $\mu_i$ values were last calculated, then the routine completes, else the routine loops to step 1104 to calculate new $\xi_i$ values.

The system learns a belief network by first calculating the values $\mu_i$, $\xi_i$, and $\phi_i$ for each of the non-holdout cases. The system then calculates a change in $\alpha_i$ and $h_i$ using gradient ascent. That is, the sum of the partial derivatives of $L_V$ for each case with respect to $J_{ij}$ or $h_i$ multiplied by a learning factor $\eta$ give the change in these values. For ji is associated with causal attribute nodes $$a_j(\text{new}) - a_j(\text{old}) = \eta \sum_l \frac{\partial L_V(l)}{\partial J_{ij}}$$

For ji associated with all other nodes, the formula is:

$$J_{ij}(\text{new}) - J_{ij}(\text{old}) = \eta \sum_l \frac{\partial L_V(l)}{\partial J_{ij}}$$

$$h_i(\text{new}) - h_i(\text{old}) = \eta \sum_l \frac{\partial L_V(l)}{\partial h_i}$$

where $L_V(l)$ is the likelihood for the $l^{th}$ case, and where $\eta$ is a suitably chosen learning rate, such as 0.1. The derivatives for the $i^{th}$ case are given by $$\frac{\partial L_V}{\partial J_{ij}} = (\xi_i - \mu_i)\mu_j + \frac{(1-\phi_i)\xi_i\mu_j e^{-\xi_i J_{ij}}}{1 - \mu_j + \mu_j e^{-\xi_i J_{ij}}} - \frac{\phi_i(1-\xi_i)\mu_j e^{(1-\xi_i)J_{ij}}}{1 - \mu_j + \mu_j e^{(1-\xi_i)J_{ij}}}$$

$$\frac{\partial L_V}{\partial h_i} = \mu_i - \phi_i$$

The system then sums $L_V$ for each case $$\left(\text{i.e.,} \sum_l L_V(l)\right)$$

to give a score for the network. If the score converges (e.g., a difference of less than $10^{-5}$) to the last calculated score, then the score is the score for the learned belief network.

Figure 12:
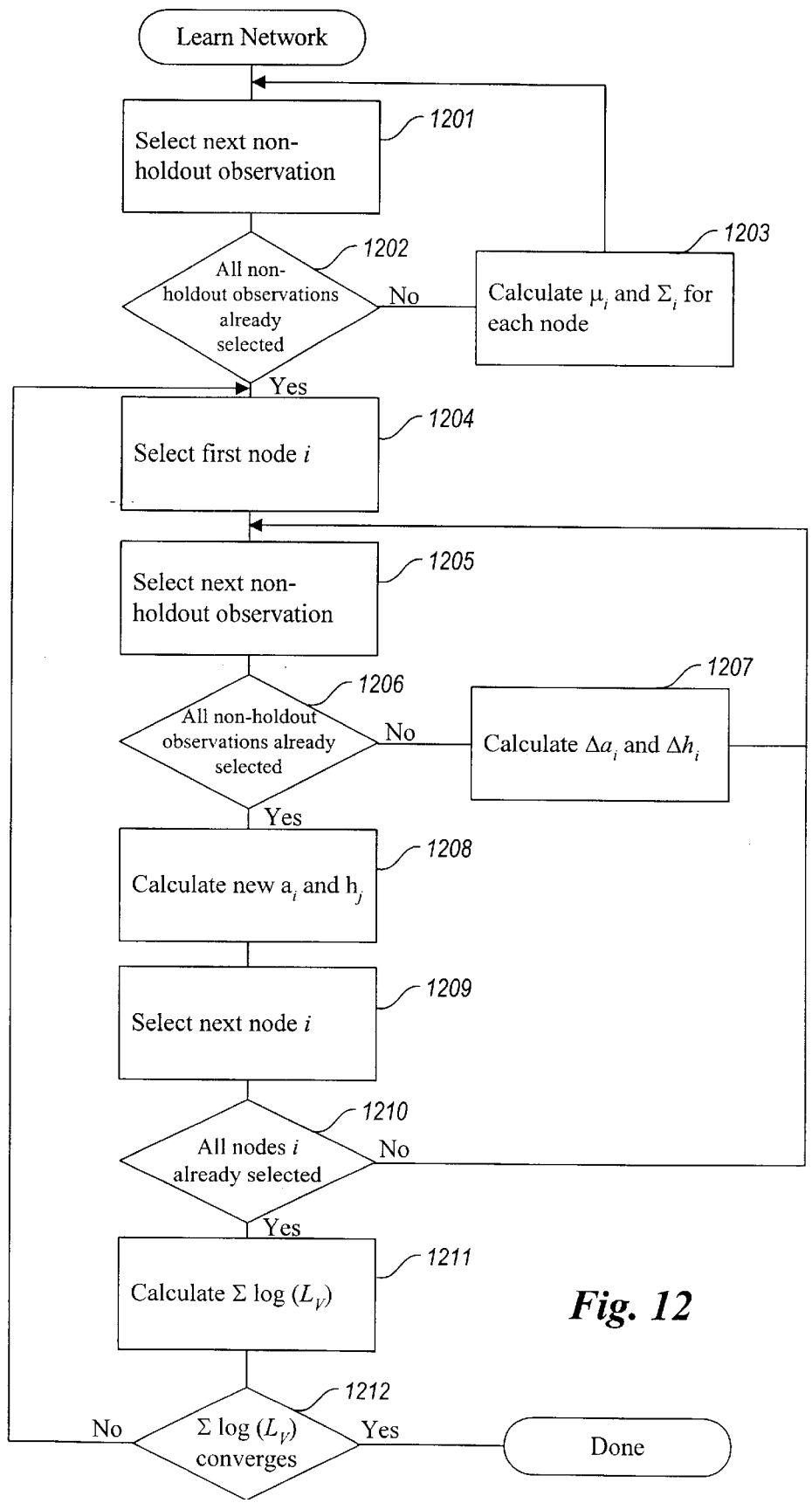
FIG. 12 is a flow diagram of the learning routine.

FIG. 12 is a flow diagram of the learning routine. In steps 1201–1203, the learning routine loops calculating the parameters for each non-holdout case. In step 1201, the routine selects the next non-holdout case starting with the first. In step 1202, if all the non-holdout cases have already been selected, then the routine continues at step 1204, else the routine continues at step 1203. In step 1203, the routine calculates the values for the parameters $\mu_i$ and $\xi_i$ and loops to step 1201 to select the next non-holdout cases. The routine calculates the values by invoking the calculate parameters routine passing the non-holdout case. In steps 1204–1212, the routine loops calculating new values for the variables $\alpha_j$ and $h_i$, until the score for the belief network converges. In step 1204, the routine selects the first node i. In steps 1205–1207, the routine loops selecting each non-holdout case and calculating the change in $\alpha_j$ and $h_i$ for each node. In step 1205, the routine selects the next non-holdout case starting with the first. In step 1206, if all the non-holdout cases have already been selected, then the routine continues at step 1208, else the routine continues at step 1207. In step 1207, the routine calculates the change in $\alpha_j$ and $h_i$ according to equations described above. In step 1208, the routine calculates a new $\alpha_j$ and $h_i$ for the selected node based on the change in $\alpha_j$ and $h_i$. In step 1209, the routine selects the next node i. In step 1210, if all the nodes i have already been selected, then the routine continues at step 1212, else the routine loops to step 1204 to select the next non-holdout case. In step 1212, the routine calculates the sum of $L_V$ over all cases. In step 1212, if the sum of $L_V$ converges, then the routine completes, else the routine loops to step 1204 to continue the learning.

Figure 13:
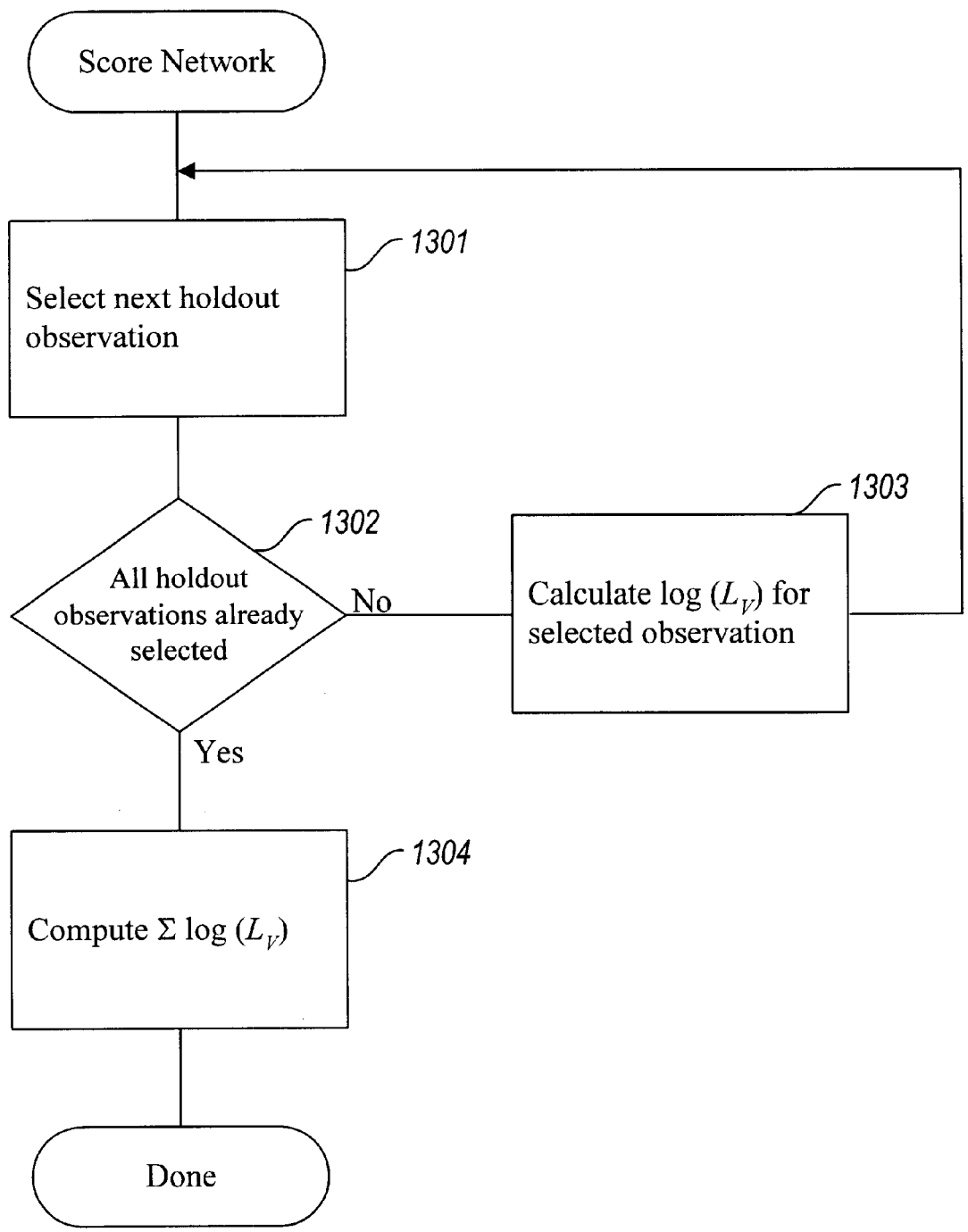
FIG. 13 is a flow diagram of the network scoring routine.

FIG. 13 is a flow diagram of the network scoring routine. This routine calculates the $L_V$ for each holdout case and returns the sum of the $L_V$'s as the network score. In step 1301, the network scoring routine selects the next holdout case starting with the first. In step 1302, if all the holdout cases have already been selected, then the routine continues at step 1304, else the routine continues at step 1303. In step 1303, the network scoring routine calculates the $L_V$ for the selected case and loops the step 1301 to select the next case. In step 1304, the network scoring routine sums the calculated $L_V$ to generate a score for the network and completes.

Figure 14:
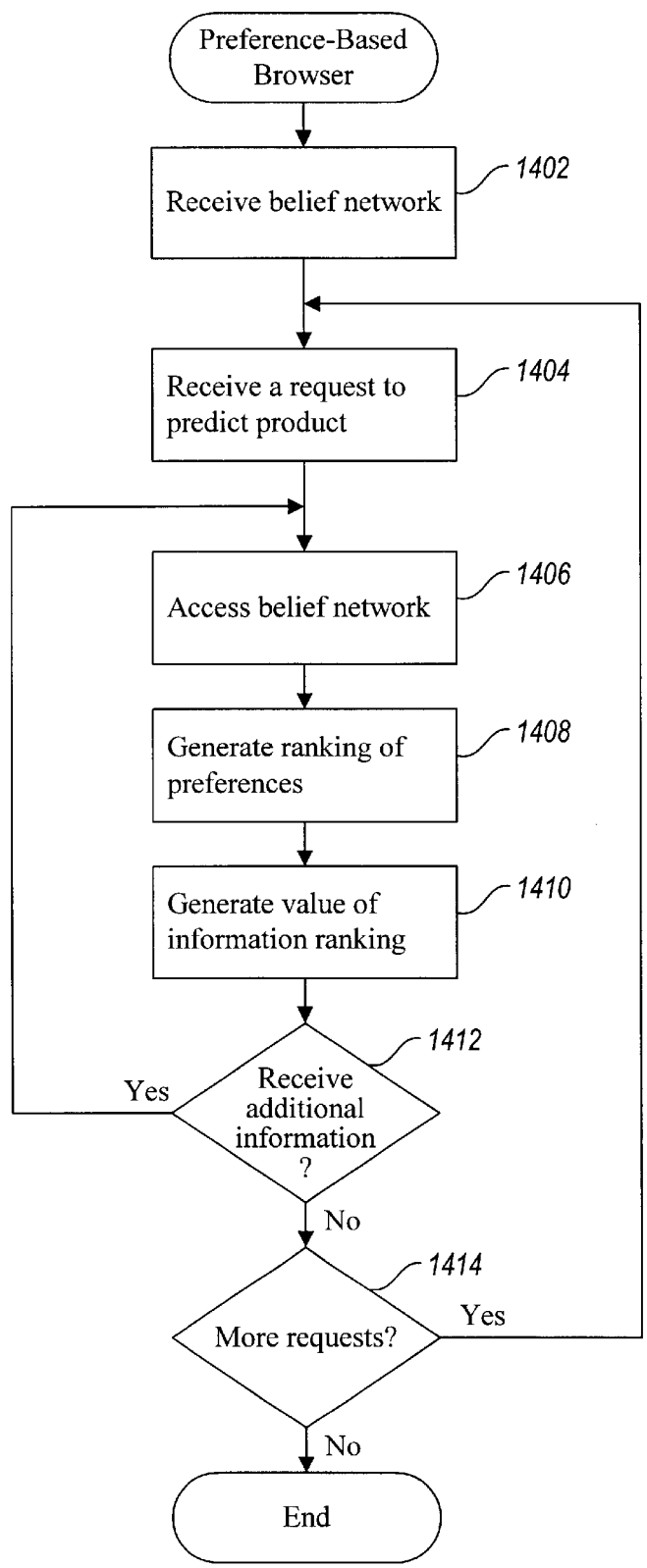
FIG. 14 depicts a flowchart of the steps performed by the preference-based browser of FIG. 3.

As previously stated, after learning a belief network, the belief network is used by the preference-based browser to predict preferences of the user. It should be appreciated by one skilled in the art that since the administration constructs an initial belief network, this belief network may be used with any learning. FIG. 14 depicts a flowchart of the steps performed by the preference-based browser 314 of an exemplary embodiment. The first step performed by the preference-based browser is to receive a belief network from the network generator (step 1402). After receiving the belief network, the preference-based browser receives a request from the user to assist in selecting a product (step 1404). Within the request are observations of various causal attributes of both the user and the products. For example, if the preference-based browser were using the belief network of FIG. 4, the type of information received would be the user's age, income, and how much memory the laptop should have. Additionally, optionally, the user supplies an indication of how important the value for the causal attribute is to the user. For example, the user may provide an indication that memory is extremely important by entering a value of 100 for $J_{ij}$, or the user may provide an indication that, although they have indicated that they want more than 32M of memory, the amount of memory is unimportant by entering a value of −100. This indication is expressed as $a_j$, which is then used to supersede the current $a_j$ in the belief network. After receiving this information, the preference-based browser accesses the belief network (step 1406). Using the values of the causal attributes, the preference-based browser accesses the belief network and computes the probability of the user liking each product P given the information received in step 1404 using the following formula, which has been previously described:

$$p(P = 1 \mid X) = \frac{p(P = 1, X)}{p(X)}$$

In one embodiment, the probabilities are represented by the parameter A as calculated by the calculate parameter routine of FIG. 11. After calculating the probability that the user will like each product P, the probabilities are used to generate a ranking of the preferences or products (step 1408). After generating the ranking of the preferences, the preference-based browser generates a value of information ranking for the nodes (either attribute nodes or preferences nodes) for which the user did not provide a value (step 1410). In this step, the preference-based browser determines the information that is considered most relevant to helping the user select a product by accessing the belief network to determine a previously unobserved variable that, when observed, would most affect the ranking of the preferences. This information is then solicited from the user in this step.

In performing this processing, the preference-based browser calculates the expected value of information (EVI). The EVI is a method of computing the expected value of acquiring information about attributes that have not yet been observed. Calculating the EVI identifies those attributes that provide the most information about the user, and by using this procedure, the preference-based browser can obtain the most relevant information from the user without asking the user about each attribute.

In this step, the EVI of each attribute is computed using the belief network, and then the preference-based browser displays the attributes to the user in descending order of their EVI. Upon viewing the attributes, the user reports the value of one of the attributes. Usually, this attribute will be the one at the top of the list, but not always. For example, the user may not want to report the value of the first attribute, because they are not sure of the answer or the answer is too costly to obtain.

The EVI of a particular attribute A, given state of information x (i.e., set of observations), is given by the following formula:

$$EVI(A|x) = \Sigma p(A=k|x) * VI(A=k|x)$$

where $VI(A=k|x)$ is the value of information of observing $A=k$ given x, and $p(A=k|x)$ is the probability of observing $A=k$ given x according to the belief network.

An appropriate expression for the value of information of observing $A=k$ given x may depend on the situation for which the predictions are used. Those skilled in the art of decision analysis are familiar with techniques for identifying appropriate expressions. The following expression, however, is appropriate for many situations:

$$\sum_i \log \frac{p(a=k \mid 1P_i=1, x)}{p(a=k \mid 1P_i=0, x)}$$

where P is the is the node corresponding to product i.

After generating the value of information ranking, the preference-based browser determines if the user has provided additional information for the attributes displayed in step 1410 (step 1412). If the user has provided additional information or observations for the attributes, processing continues in step 1406. However, if the user has not provided additional information, then the list currently displayed to the user is the list of products that the user most likely wants given the information they have provided. The preference-based browser then determines if the user has provided more requests (step 1414). If the user has provided an additional request, processing continues in step 1404; otherwise, processing ends.

While the present invention has been described with reference to a preferred embodiment thereof, those skilled in the art will know of various changes in form that may be made without departing from the spirit and scope of the claimed invention as defined in the appended claims. For example: the present invention can be practiced without performing collaborative filtering.

What is claimed is:

1. A method in a computer system having an electronic shopping aid for predicting a desired product of a user from among a plurality of available products based on a preference of the user for attributes of the available products, the method performed by the electronic shopping aid, comprising the steps of:
   receiving a belief network containing attribute nodes and preference nodes, the attribute nodes reflecting the attributes of the available products and having a value, the preference nodes reflecting the available products, each preference node having a probability distribution indicating the likelihood that the available product is the desired product of the user given a value of at least one of the attribute nodes;
   receiving a request to determine an available product having a greatest likelihood of being the desired product, the request containing a value for at least one of the attribute nodes and an indication of an importance to the user that the desired product have the attribute reflected by the value of the at least one of the attribute nodes;
   determining the available product having the greatest likelihood of being the desired product by evaluating the probability distributions of the preference nodes given the value for the at least one of the attribute nodes and given the indication for the importance;
   indicating the available product having the greatest likelihood of being the desired product to the user;
   determining unspecified attribute nodes, which are attribute nodes for which a value was not received in the request;
   determining an expected value of information for each of the unspecified attribute nodes by accessing the bellied network to determine how much a value for the unspecified attribute node influences which of the available products is designated as the available product having the greatest likelihood of being the desired product; and
   ranking the unspecified attribute nodes according to the expected value of information.

2. The method of claim 1 wherein the attribute nodes include at least one user attribute node reflecting a characteristic of the user, and wherein the step of receiving a request includes receiving the request containing a value for the user attribute node.

3. The method of claim 2 wherein the step of determining includes performing collaborative filtering such that the determination of the available product is based on historical data of whether other users with a characteristic similar to that of the user have liked the available products.

4. A method in a computer system having an electronic shopping aid for predicting a desired product of a user from among a plurality of available products based on a preference of the user for attributes of the available products, the method performed by the electronic shopping aid, comprising the steps of:
   receiving a belief network containing attribute nodes and preference nodes, the attribute nodes reflecting the attributes of the available products and having a value, the preference nodes reflecting the available products, each preference node having a probability distribution indicating the likelihood that the available product is the desired product of the user given a value of at least one of the attribute nodes;
   receiving a request to determine an available product having a greatest likelihood of being the desired product, the request containing a value for at least one of the attribute nodes;
   determining the available product having the greatest likelihood of being the desired product by evaluating the probability distributions of the preference nodes given the value of the at least one of the attribute nodes; and
   indicating the available product having the greatest likelihood of being the desired product to the user.

5. The method of claim 4, further including the steps of, for each available product, calculating a likelihood that the available product is the desired product given the values of the attribute nodes and indicating the calculated likelihood to the user.

6. The method of claim 4 wherein the attribute nodes include at least one user attribute node reflecting a characteristic of the user, and wherein the step of receiving a request includes receiving the request containing a value for the user attribute node.

7. The method of claim 6 wherein the step of determining includes performing collaborative filtering such that the determination is based on historical data of whether other users with a characteristic similar to that of the user have like the available products.

8. The method of claim 4, further including the steps of:
   determining unspecified attribute nodes, which are attribute nodes for which a value has not been received in the step of receiving a request; and
   ranking the unspecified attribute nodes according to ah expected value of information.

9. The method of claim 8, further including the steps of:
   displaying to the user the ranking of the unspecified attribute nodes;
   receiving from the user a value for at least one of the unspecified attribute nodes; and
   responsive to receiving the value for the at least one of the attribute nodes, performing the step of determining the available product and the step of indicating to indicate a new available product having eh greatest likelihood of being the desired product.

10. The method of claim 4 wherein the belief network includes at least one hierarchical attribute node that causally influences at least one of the attribute nodes.

11. The method of claim 4 wherein the belief networks is a Sigmoid belief network.

12. The method of claim 4 wherein the computer system includes a belief network generator for creating the belief network before the electronic shopping aid receives the belief network, wherein the belief network generator performs the following steps:
   receiving expert data comprising an initial belief network containing a hidden attribute node and at least one preference node, the hidden attribute node being an unknown factor that causally influences the available products;
   receiving data comprising sets of values for the preference nodes;
   determining groups of sets having similar values, wherein each group has a plurality of sets of values;
   receiving an indication of a causal factor in the determined groups to account for the similarity of the values in the sets of values in the groups;
   receiving observations for the identified causal factor and adding the observations to the data; and
   adding the causal factor to the initial belief network as an attribute node after receiving the observations.

13. The method of claim 12 wherein the steps of determining groups, receiving an indication, receiving observations, and adding the causal factor are repeatedly performed until either a causal factor cannot be identified or observations for the causal factor cannot be gathered.

14. An electronic shopping aid for predicting a desired product of a user from among a plurality of available products based on a preference of the user for attributes of the available products, comprising:
   a belief network containing attribute nodes and preference nodes, the attribute nodes reflecting a plurality of the attributes of the available products and having a value, the preference nodes reflecting the available products, each preference code having a weight that is an indication of how much a value of at least one of the attribute nodes influences whether the available product reflected by the preference node is the desired product of the user given the value of the at least one of the attribute nodes;
   a receive component for receiving a request to determine an available product having a greatest likelihood of being the desired product, the request containing a value for at least one of the attribute nodes;
   a determination component for determining the available product having the greatest likelihood of being the desired product by evaluating the weights of the preference nodes given the value of the at least one of the attribute nodes; and
   an output component for indicating the available product having the greatest likelihood of being the desired product.

15. The electronic shopping aid of claim 14 wherein the request contains an indication of how important it is to the user that the desired product have the attribute reflected by the value of the at least one of the attribute nodes, and wherein the determination component adjusts at least one of the weights in the belief network in response to receiving the indication.

16. The electronic shopping aid of claim 14 wherein the belief networks include hierarchical attribute nodes that causally influence at least one of the attribute nodes.

17. The electronic shopping aid of claim 14, further including a value of information component that determines unspecified attribute nodes for which a value was not received in the request and that ranks the unspecified attribute nodes according to an expected value of information for the unspecified attribute nodes.

18. The electronic shopping aid of claim 17 wherein the value of information component outputs the ranked unspecified attribute nodes to the user, receives from the user a value for at least one of the unspecified attribute nodes, and responsive to receiving the value for at least one of the unspecified attribute nodes, invokes the determination component and the output component to output the available product having the greatest likelihood of being the desired product.

19. The electronic shopping aid of claim 14 wherein the belief network is a Sigmoid belief network.

20. The electronic shopping aid of claim 14 wherein at least one of the attribute nodes reflects an attribute of the user.

21. The electronic shopping aid of claim 20 wherein the determination component determines the available product having the greatest likelihood of being the desired product based on preferences of other users.

22. The electronic shopping aid of claim 14 wherein each preference node includes parameters for a probability distribution for use in determining the likelihood of the product reflected by the preference node being the desired product.

23. A computer-readable memory device that contains a data structure representing a belief network that comprises nodes, the belief network for use in an electronic shopping aid for predicting a desired product of a user from among a plurality of available products based on attributes of the available products, the nodes comprising:
   attribute nodes reflecting the attributes of the available products, wherein each attribute node has a value; and
   preference nodes reflecting the available products for selection by the user, each preference node having a probability distribution indicating a likelihood that the available product is the desired product of the user given a value for at least one of the attribute nodes, wherein the electronic shopping aid receives a request for determining a desired product of a user from among the available products, wherein the request contains values for the attribute nodes, and in response to receiving the request, the electronic shopping aid evaluates the probability distributions of the preference nodes to determine the available product that is most likely to be the desired product given the value for the at least one of the attribute nodes in the request.

24. The computer-readable memory device of claim 23 wherein the data structure includes a hierarchical attribute node that causally influences at least one of the attribute nodes.

25. A method in a computer system having a collaborative filtering system for predicting a desired product preference of a user based on attributes of the product, the method performed by the collaborative filtering system, comprising the steps of
   receiving a belief network containing attribute nodes and preference nodes, the attribute nodes reflecting the attributes of the product and having a value, the preference nodes reflecting available preferences of the user, each preference node having a probability indicating the likelihood that the available preference is the desired preference of the user given a value for at least one tie of the attribute nodes;

receiving a request to determine an available preference having a greatest likelihood of being the desired preference, the request containing a value for at least one for the attribute nodes;

determining the available preference having the greatest likelihood of being the desired preference by evaluating the probabilities of the preference nodes given the value of the at least one of the attribute nodes;

indicating the available preference having the greatest likelihood of being the desired preference to the user;

determining which of the attribute nodes are unspecified attribute nodes for which a value was not received in the request;

determining an expected value of information for each of the unspecified attribute nodes, the expected value of information indicating bow important a value for the unspecified attribute node is in determining the desired preference; and displaying to the user the unspecified attribute node with the greatest expected value of information.

26. The method of claim 25, further including the steps of receiving a value from the user for at least one of the unspecified attribute nodes;

determining the available preference having the greatest likelihood of being the desired preference by evaluating the probabilities of the preference nodes given the value of the at least one of the attribute nodes and the received value for the at least one of the unspecified attribute nodes; and indicating the available preference having the greatest likelihood of being the desired preference to the user.

27. The method of claim 25 wherein the belief network has at least one hierarchical attribute node that causally influences at least one attribute node, wherein the step of receiving a request includes receiving a value for the hierarchical attribute node, and wherein the step of determining includes basing the determination on the value of the hierarchical attribute node.

28. A computer readable medium containing instructions for controlling a computer system having an electronic shopping aid to perform a method, the method for predicting a desired product of a user from among a plurality of available products based on a preference of the user for attributes of the available products, the method performed by the electronic shopping aid, comprising the steps of:

receiving a belief network containing attribute nodes and preference nodes, the attribute nodes reflecting the attributes of the available products and having a value, the preference nodes reflecting the available products, each preference node having a probability distribution indicating the likelihood that the available product is the desired product of the user given a value of the at least one of the attribute nodes;

receiving a request to determine an available product having a greatest likelihood of being the desired product the request containing a value for at least one of the attribute nodes;

determining the available product having the greatest likelihood of being the desired product by evaluating the probability distributions of the preference nodes given the value of the at least one of the attribute nodes; and indicating the available product having the greatest likelihood of being the desired product to the user.

29. The computer readable medium of claim 28, further including the steps of, for each available product, calculating a likelihood that the available product is the desired product given the values of the attribute nodes and indicating the calculated likelihood to the user.

30. The computer readable medium of claim 28 wherein the attribute nodes include at least one user attribute node reflecting a characteristic of the user, and wherein the step of receiving a request includes receiving the request containing a value for the user attribute node.

31. The computer readable medium of claim 30 wherein the step of determining includes performing collaborative filtering such that the determination is based on historical data of whether other users with a characteristic similar to that of the user have liked the available products.

32. The computer readable medium of claim 28, further including the steps of:

determining unspecified attribute nodes, which ate attribute nodes for which a value has not been received in the step of receiving a request; and ranking the unspecified attribute nodes according to an expected value of information.

33. The computer readable medium of claim 32, further including the steps of:

displaying to the user the ranking of the unspecified attribute nodes;

receiving from the user a value for at least one of the unspecified attribute nodes; and responsive to receiving the value for the at least one of the attribute nodes, performing the step of determining the available product and the step of indicating to indicate a new available product having the greatest likelihood of being the desired product.

34. The computer readable medium of claim 28 wherein the belief network includes at least one hierarchical attribute node that causally influences at least one of the attribute nodes.

35. The computer readable medium of claim 28 wherein the belief network is a Sigmoid belief network.

36. The computer readable medium of claim 28 wherein the computer system includes a belief network generator for creating the belief network before the electronic shopping aid receives the belief network, wherein the belief network generator performs the following steps:

receiving expert data comprising an initial belief network containing a hidden attribute node and at least one preference node, the hidden attribute node being an unknown factor that causally influences the available products;

receiving data comprising sets of values for the preference nodes;

determining groups of sets having similar values, wherein each group has a plurality of sets of values;

receiving an indication of a causal factor in the determined groups to account for the similarity of the values in the sets of values in the groups;

receiving observations for identified causal factor and adding the observations to the data, and adding the causal factor to the initial belief network as an attribute node after receiving the observations.

37. The computer readable medium of claim 36 wherein the steps of determining groups, receiving an indication, receiving observations, and adding the causal factor are repeatedly performed until either a causal factor cannot be identified or observations for the causal factor cannot be gathered.

38. A computer readable medium containing instructions for controlling a computer system having a collaborative filtering system to perform a method for predicting a desired preference of a user based on attributes of the user, the method performed by the collaborative filtering system, comprising the steps of:

receiving a belief network containing attribute nodes and preference nodes, the attribute nodes reflecting attributes of a product and having a value, the preference nodes reflecting available preferences of the user, each preference node having a probability indicating the likelihood that the available preference is the desired preference of the user for an available product given a value for at least one of the attribute nodes;

receiving a request to determine an available preference having a greatest likelihood of being the desired preference, the request contain a value for at lean one of the attribute nodes;

indicating the available preference having the greatest likelihood of being the desired preference to the user;

determining which of the attribute nodes are unspecified attribute nodes for which a value was not received in the request;

determining an expected value of information for each of the unspecified attribute nodes, the expected value of information indicating how important a value for the unspecified attribute node is in determining the desired preference; and displaying to the user the unspecified attribute node with the greatest expected value of information.

39. The computer readable medium of claim 38, further including the steps of:

receiving a value from the user for at least one of the unspecified attribute nodes;

determining the available preference having the greatest likelihood of being the desired preference by evaluating the probabilities of the preference nodes given the value of the at least one of the attribute nodes and the received value for the at least one of the unspecified attribute nodes; and indicating the available preference having die greatest likelihood of being the desired preference to the user.

40. The computer readable medium of claim 38 wherein the belief network has at least one hierarchical attribute node that causally influences at least one attribute node, wherein the step of receiving a request includes receiving a value for the hierarchical attribute node, and wherein the step of determining includes basing the determination on the value of the hierarchical attribute node.

41. A method in a computer system having an electronic shopping aid for predicting a desired product of a user from among a plurality of available products, the method performed by the electronic shopping aid, comprising the steps of:

receiving a belief network containing attribute nodes and preference nodes, the attribute nodes reflecting the attributes of the available products and having a value, the preference nodes reflecting the available products, each preference node having a probability distribution indicating the likelihood that the available product is the desired product of the user;

receiving a request to determine an available product having a greatest likelihood of being the desired product;

determining the available product having the greatest likelihood of being the desired product by evaluating the probability distributions of the preference nodes; and indicating the available product having the greatest likelihood of being the desired product to the user.

42. The method of claim 41 wherein the request includes a value for at least one of the attribute nodes and wherein the step of determining includes determining the available product having the greatest likelihood of being the desired product by evaluating the probability distributions of the preference nodes given the value of the at least one of the attribute nodes.

43. The method of claim 41 wherein the request includes a value for at least one of the preference nodes, and wherein the step of determining includes determining the available product having the greatest likelihood of being the desired product by evaluating the probability distributions of the preference nodes given the value of the at least one of the preference nodes.

44. The method of claim 41 wherein the belief network includes a characteristic node reflecting a characteristic of the user, wherein the request includes a value for the characteristic node, and wherein the determining step includes determining the available product having the greatest likelihood of being the desired product by evaluating the probability distributions of the preference nodes given the value of the characteristic nodes.

45. A method in a computer system having a collaborative filtering system for predicting a desired preference of a user, the method performed by the collaborative filtering system, comprising the steps of:

receiving a belief network containing attribute nodes and preference nodes, the attribute nodes reflecting the attributes of a product and having a value the preference nodes reflecting available preference of the user based on a value of at least one of the attribute nodes, each preference is the desired preference of the user;

receiving a request to determine an available preference having a greatest likelihood of being the desired preference;

determining the available preference having the greatest likelihood of being the desired preference by evaluating probabilities of the preference node;

indicating the available preference having the greatest likelihood of being the desired preference to the user;

determining which of the attribute nodes are unspecified attribute nodes for which a value was not received in the request;

determining an expected value of information for each of the unspecified attribute nodes, the expected value of information indicating how important a value for the unspecified attribute node is in determining the desired preference; and displaying to the user the unspecified attribute node with the greatest expected value of information.

46. The method of claim 45 wherein the request includes a value for at least one of the attribute nodes and wherein the step of determining includes determining the available product having the greatest likelihood of being the desired product by evaluating the probability distributions of the preference nodes given the value of the at least one of the attribute nodes.

47. The method of claim 45 wherein the request includes a value for at least one of the preference nodes, and wherein the step of determining includes determining the available product having the greatest likelihood of being the desired product by evaluating the probability distributions of the preference nodes given the value of the at least one of the preference nodes.

48. The method of claim 45 wherein the belief network includes a characteristic node reflecting a characteristic of the user, wherein the request includes a value for the characteristic node, and wherein the determining step includes determining the available product having the greatest likelihood of being the desired product by evaluating the probability distributions of the preference nodes given the value of the characteristic nodes.

* * * * *